(12) United States Patent
Chung et al.

(10) Patent No.: US 7,441,586 B2
(45) Date of Patent: Oct. 28, 2008

(54) HEAT EXCHANGE APPARATUS AND VENTILATION SYSTEM USING THE SAME

(76) Inventors: In Sook Chung, 22-704 Hyundai Apt., Ichon-Dong, Yongsan-Gu, Seoul (KR) 140-723; Geon-Soo Han, A-321 Twin Tower, Yangjae 2-Dong, Seocho-Gu, Seoul (KR) 137-944

( * ) Notice: Subject to any disclaimer, the term of this patent is extended or adjusted under 35 U.S.C. 154(b) by 0 days.

(21) Appl. No.: 11/775,718

(22) Filed: Jul. 10, 2007

(65) Prior Publication Data
US 2008/0017347 A1 Jan. 24, 2008

Related U.S. Application Data

(63) Continuation of application No. PCT/KR2005/003650, filed on Nov. 1, 2005.

(30) Foreign Application Priority Data

Jan. 10, 2005 (KR) ...................... 10-2005-0002115

(51) Int. Cl.
*F23L 13/04* (2006.01)
*F28D 1/02* (2006.01)
(52) U.S. Cl. ................. 165/4; 165/57; 165/97
(58) Field of Classification Search .............. 165/4, 165/54, 56, 57, 97, 100; 454/252, 347; 96/144; 62/271; 55/338.1; 95/113
See application file for complete search history.

(56) References Cited

U.S. PATENT DOCUMENTS 3,211,217 A * 10/1965 Mckee et al. ............... 165/95

4,093,435 A 6/1978 Marron et al.

(Continued)

FOREIGN PATENT DOCUMENTS

JP 09-310899 A 12/1997

(Continued)

OTHER PUBLICATIONS

International Search Report dated Feb. 1, 2006 from corresponding International Application No. PCT/KR2005/003650 in 8 pages.

(Continued)

*Primary Examiner*—Teresa J Walberg
(74) *Attorney, Agent, or Firm*—Knobbe, Martens, Olson & Bear, LLP

(57) ABSTRACT

Disclosed is a heat exchange apparatus. The heat exchange apparatus comprises a first valve member rotating about a first rotational axis, a second valve member rotating about a second rotational axis, and a heat exchanging medium that is positioned on a gas stream path formed between the first valve member and the second valve member, has a channel for enabling gas to pass therethrough, and receives and stores thermal energy from passing hot gas and then transfers the stored thermal energy to passing cold gas. A flow direction of the gas passing through the heat exchanging medium is repeatedly changed as the first and second valve members rotate. The heat exchange apparatus has first and second guides connected respectively to both sides of the heat exchanging medium and has passages for guiding the gas passing through the heat exchanging medium.

29 Claims, 18 Drawing Sheets

U.S. PATENT DOCUMENTS

| | | | |
|---|---|---|---|
| 4,497,361 A | | 2/1985 | Hajicek |
| 4,646,813 A | | 3/1987 | Akio et al. |
| 4,688,626 A | * | 8/1987 | Tengesdal .................. 165/4 |
| 4,952,283 A | * | 8/1990 | Besik ........................ 165/4 |
| 5,069,272 A | | 12/1991 | Chagnot |
| 5,230,719 A | * | 7/1993 | Berner et al. ............. 96/144 |
| 5,515,909 A | * | 5/1996 | Tanaka ...................... 165/4 |
| 5,983,986 A | * | 11/1999 | Macintyre et al. ......... 165/9 |
| 6,257,317 B1 | * | 7/2001 | DeGregoria et al. ....... 165/8 |
| 2003/0102106 A1 | * | 6/2003 | Moilala ..................... 165/4 |

FOREIGN PATENT DOCUMENTS

| | | |
|---|---|---|
| JP | 11-023042 A | 1/1999 |
| KR | 1990-0002453 Y1 | 3/1990 |

OTHER PUBLICATIONS

International Preliminary Report on patentability dated Apr. 24, 2007 from corresponding International Application No. PCT/KR2005/003650 in 4 pages.

* cited by examiner (a)  (b)

(a)  (b)

_US 7,441,586 B2_

HEAT EXCHANGE APPARATUS AND VENTILATION SYSTEM USING THE SAME

CROSS-REFERENCE TO RELATED PATENT APPLICATIONS

This application is a continuation application under 35 U.S.C. § 365(c) of International Application No. PCT/KR2005/003650, filed Nov. 1, 2005 designating the United States. International Application No. PCT/KR2005/003650 was published in English as WO2006/073232 A1 on Jul. 13, 2006. This application further claims the benefit of the earlier filing dates under 35 U.S.C. § 365(b) of Korean Patent Application No. 10-2005-0002115 filed Jan. 10, 2005. This application incorporates herein by reference the International Application No. PCT/KR2005/003650 including the International Publication No. WO2006/073232 A1 and the Korean Patent Application No. 10-2005-0002115 in their entirety.

BACKGROUND

1. Field

The present disclosure relates to a heat exchange apparatus, and more particularly, to a heat exchange apparatus which can be used in a ventilation system.

2. Discussion of the Related Technology

As recent buildings have become many-storied and airtight through the development of construction techniques, natural introduction of fresh outdoor air into rooms is intercepted and thus indoor air pollution levels increase, resulting in negative health influences on persons residing in such buildings. One of the best ways is to introduce a large amount of fresh outdoor air into rooms through active ventilation. However, additional energy costs for heating, humidifying, cooling and dehumidifying the air to be introduced into the rooms may be incurred to properly maintain the temperature and humidity of the indoor air.

A heat exchanging ventilator is a ventilator equipped with a heat exchange apparatus for transferring thermal energy from hot air to cold air, wherein polluted indoor air is exhausted to the outside and fresh outdoor air is introduced into a room while thermal energy included in the hot air is recovered and then transferred to the cold air. Therefore, this heat exchanging ventilator is usefully employed due to saving of additional energy costs incurred during ventilation. Heat exchangers for use in an exemplary heat exchanging ventilators are classified into a plate type heat exchange apparatus and a rotary type heat exchange apparatus according to heat exchanging manners.

FIG. 1 shows an example of an exemplary heat exchanging ventilator, which is equipped with a plate type heat exchange apparatus. Referring to FIG. 1, a heat exchanging ventilator 10$e$ comprises a case 11$e$, a plate type heat exchange apparatus 20$e$, four partition walls 12$e$, 13$e$, 14$e$ and 15$e$, an exhaust blower 16$e$, and an intake blower 17$e$. Referring to FIGS. 1 and 2, the plate type heat exchange apparatus 20$e$ has a hexahedral shape and is constructed of multiple layers. Each layer has a plurality of long, narrow channels through which air passes, and channels in odd-numbered layers and channels in even-numbered layers are arranged to extend in directions orthogonal to each other. Referring to FIG. 1, the plate type heat exchange apparatus 20$e$ is positioned at the center of the interior of the case 11$e$. The four partition walls 12$e$, 13$e$, 14$e$ and 15$e$ extend from four side edges of the heat exchange apparatus 20$e$ to partition the interior of the case 11$e$ into four spaces. Two diagonally positioned spaces of the four spaces formed in the case 11$e$ communicate with each other through the heat exchange apparatus 20$e$. The exhaust blower 16$e$ and the intake blower 17$e$ are installed respectively in two adjacent spaces of the four spaces formed in the case 11$e$. In such a configuration, if the exhaust blower 16$e$ and the intake blower 17$e$ are operated, ventilation is achieved in such a manner that a cold intake air stream 21$e$ receives thermal energy from a hot exhaust air stream 19$e$ while passing through the long, narrow channels of the plate type heat exchange apparatus 20$e$ and is then introduced into a room as a hot intake air stream 18$e$, whereas the hot exhaust air stream 19$e$ transfers the thermal energy to the cold intake air stream 21$e$ while passing through the long, narrow channels of the heat exchange apparatus 20$e$ and is then exhausted outdoors as a cold exhaust air stream 22$e$. The temperature exchange efficiency of the plate type heat exchange apparatus 20$e$ is determined depending on length L, height H, the sectional shape and size of a channel, and a flow rate through the channel, which are illustrated in FIG. 2, and moisture included in air is not exchanged.

The ventilator employing the plate type heat exchange apparatus has a temperature exchange efficiency of about 70% to 80% and an enthalpy exchange efficiency of about 40% to 50%, and has a simpler structure and a higher degree of freedom in view of design for its appearance and can be more slimly designed compared with a ventilator employing a rotary type heat exchange apparatus. Thus, a ventilator employing a plate type heat exchange apparatus can be applied to a small-sized heat exchanging ventilator. However, since moisture included in the air is not exchanged during heat exchange, the air 18$e$ introduced into the room is dry and the ventilator employing the plate type heat exchange apparatus has a relatively low enthalpy exchange efficiency, which is a barometer of energy savings, as compared with a ventilator employing a rotary type heat exchange apparatus, resulting in lowered usefulness thereof. In addition, if dust included in the outdoor intake air stream 21$e$ and the indoor exhaust air stream 19$e$, which are introduced into the ventilator 10$e$, is deposited in the long, narrow channels formed in the heat exchange apparatus 20$e$, the temperature and enthalpy exchange efficiencies are lowered and the flow rate is abruptly decreased. Thus, the heat exchange apparatus 20$e$ should be periodically cleaned during usage. However, since it is difficult to clean out dust deposited in the long, narrow channels, the heat exchange apparatus should be frequently replaced after use for a certain period of time. This becomes a cause of serious deterioration of the economic efficiency of the heat exchanging ventilator.

FIG. 3 shows another example of an exemplary heat exchanging ventilator, which is equipped with a rotary type heat exchange apparatus. Referring to FIG. 3, a heat exchanging ventilator 10$f$ comprises a case 11$f$, a rotary type heat exchange apparatus 20$f$, an exhaust blower 16$f$, and an intake blower 17$f$. Referring to FIGS. 3 and 4, the rotary type heat exchange apparatus 20$f$ has a rotating wheel 24$f$ containing a heat exchanging medium or heat exchanger 23$f$ and the interior thereof is partitioned into four regions by first and second partition walls 12$f$ and 13$f$ crossing each other. The rotating wheel 24$f$ is installed on the first partition wall 12$f$ such that a rotational axis thereof is perpendicular to the first partition wall 12$f$, and the rotating wheel is rotated by means of a motor 25$f$ and a power transmission device 26$f$. The interior of the case 11$f$ is partitioned into the four spaces by means of the two partition walls 12$f$ and 13$f$. The exhaust blower 16$f$ and the intake blower 17$f$ are installed respectively in two diagonally positioned spaces of the four spaces formed in the case 11$f$. Referring to FIGS. 3 and 5, a hot exhaust air stream 19$f$ transfers thermal energy and moisture to a portion of the heat exchanging medium 23f while passing through the heat exchanging medium 23f and is then exhausted outdoors as a cold exhaust air stream 22f, whereas the portion of the heat exchanging medium 23f, which has received the thermal energy and the moisture from the hot exhaust air stream 19f, is rotated together with the rotating wheel 24f and comes into contact with a cold intake air stream 21f. The cold intake air stream 21f receives the thermal energy and moisture from the heat exchanging medium 23f while passing through the portion of the heat exchanging medium 23f, which has received thermal energy and moisture from the hot exhaust air stream 19f, and is then introduced into a room as a hot intake air stream 18f. A ventilator employing such a rotary type heat exchange apparatus has a temperature exchange efficiency of about 80% to 95% and an enthalpy exchange efficiency of about 60% to 75%. Since the moisture included in the air is exchanged together with the thermal energy during heat exchange contrary to a ventilator employing a plate type heat exchange apparatus, the air introduced into the room is less dry and the enthalpy exchange efficiency that is a barometer of energy savings is relatively higher as compared with a ventilator employing a plate type heat exchange apparatus, resulting in increased usefulness thereof. On the other hand, since the intake blower 17f and the exhaust blower 16f should be positioned on both sides of the rotating wheel 24f, this ventilator is relatively bulkier than a ventilator employing a plate type heat exchange apparatus. In addition, since the heat exchanging medium 23f is fixed to the disk-shaped rotating wheel 24f, the degree of freedom in view of design for its appearance is decreased. Thus, a ventilator employing a rotary type heat exchange apparatus is mainly used as a large-sized heat exchanging ventilator.

In addition, a ventilator employing a rotary type heat exchange apparatus suffers from decrease in the efficiency due to air leakage. This is shown in FIG. 5. Referring to FIG. 5, since heat and moisture are transferred while the rotating wheel 24f is rotated, gaps exist between the rotating wheel 24f and the two partition walls 12f and 13f, and air leaks through the gaps. An axial leaking air stream 27f generated through the gap between the first partition wall 12f and the rotating wheel 24f is a cause of deterioration of heat exchange efficiency, and an indoor-side leaking air stream 28f of two radial leaking air streams 28f and 29f generated through the gaps between the second partition wall 13f and the rotating wheel 24f, becomes mixed, as a portion of the polluted exhaust air stream 19f, with the indoor intake air stream 18f and then introduced into the room again. Thus, the leaking air stream 28f is a cause of reduction in a net intake air stream. Thus, the amount of radial leaking air stream 28f is limited to less than 10%, which causes additional production costs and power loss in operation. Thus, this ventilator has limited applications in spite of its better heat exchange efficiency than that of a ventilator employing a plate type heat exchange apparatus.

As for the heat exchanging medium for use in the rotary type heat exchange apparatus, there have been developed more efficient and reasonable heat exchanging media to improve thermal energy and moisture exchange efficiencies and to reduce pressure loss generated when air passes through the heat exchanging media. U.S. Pat. No. 4,497,361 discloses a structure capable of automatically cleaning a heat exchanging medium, wherein suitable porosity is kept by incorporating a network structure made of plastic or metal wires coated with a moisture absorbent into a disk. U.S. Pat. No. 4,093,435 discloses a honeycomb structure, wherein multiple layers of a corrugated cardboard with a specific composition, density and thickness are formed in a wheel to make a plurality of parallel passages in a flowing direction of air.

However, such heat exchanging media having a network structure and a honeycomb structure are easily contaminated in use due to impurities included in the air, and they have difficulty in disassembling the heat exchanging media contained in the rotating wheel and cleaning and assembling the heat exchanging media subsequently. In particular, a small-sized rotary type heat exchange apparatus has serious difficulty in dissembling, cleaning and assembling a contaminated heat exchanging medium. Thus, this is a cause of difficulty in applying a rotary type heat exchange apparatus to a small-sized heat exchanging ventilator. Furthermore, since the heat exchanging medium formed of the corrugated cardboard disclosed in U.S. Pat. No. 4,093,435 is rolled around the wheel, it is impossible to dissemble and assemble the heat exchanging medium. In addition, since the heat exchanging medium suffers from changes in length and thence in shape due to the variance of temperature, the durable life of the heat exchange apparatus is eventually shortened.

Recently, in order to complement the disadvantages of the heat exchanging medium with the network structure or honeycomb structure, U.S. Pat. No. 5,069,272 discloses random matrix media constructed of a plurality of connected heat-containing fibrous materials with small diameters. These random matrix media have interconnections mainly achieved by mechanical means such as needle punching, and can be easily attached to and detached from a wheel that is partitioned into one or more regions. Thus, the random matrix media have advantages in that they can be easily cleaned and made into a slimmer configuration. However, during a ventilating operation, the materials in the form of staples interconnected through needle punching are separated and then mixed with and floated in an air stream introduced into a room. Further, the materials in the form of staples are separated and lost during cleaning. Thus, it has been revealed that it is difficult to keep the original heat and moisture exchange efficiencies and the random matrix media are compressed to represent a remarkable decrease in its porosity after use for a long time, thereby increasing resistance against an air stream.

The foregoing discussion is to provide general background information, and does not constitute an admission of prior art.

SUMMARY

One aspect of the invention provides a heat exchange apparatus, comprising: a heat exchanger comprising a first side and a second side, wherein the heat exchanger is configured to allow an air or gas to flow therethrough between the first side and the second side, wherein the heat exchanger is further configured to exchange heat with the air or gas flowing therethrough between the first side and the second side; a first rotary valve located facing the first side of the heat exchanger and configured to rotate about a first axis, wherein the first rotary valve is further configured to change flow directions of the air or gas as rotating about the first axis; and a second rotary valve located facing the second side of the heat exchanger and configured to rotate about a second axis, wherein the second rotary valve is further configured to change flow directions of the air or gas as rotating about the second axis, wherein the second rotary valve is configured to rotate in synchronization with the first rotary valve so as to form a plurality of predetermined flow modes.

In the foregoing apparatus, the first rotary valve and the second rotary valve may be configured to form a first one of the plurality of predetermined flow modes, wherein in the first flow mode, the first rotary valve is configured to receive a flow of the air or gas into the apparatus and direct the flow to the heat exchanger, and the second rotary valve is configured to receive the flow from the heat exchanger and direct the flow from the heat exchanger to outside the apparatus. The first rotary valve and the second rotary valve may be configured to form a second one of the plurality of predetermined flow modes, wherein in the second flow mode, the second rotary valve is configured to receive a flow of the air or gas into the apparatus and direct the flow to the heat exchanger, and the first rotary valve is configured to receive the flow from the heat exchanger and direct the flow from the heat exchanger to outside the apparatus. The heat exchanger may comprise a first portion and a second portion, wherein the first rotary valve and the second rotary valve may be configured to form a third one of the plurality of predetermined flow modes, wherein in the third flow mode, the first rotary valve is configured to receive a first flow of the air or gas into the apparatus and direct the first flow to the first portion of the heat exchanger, and the second rotary valve is configured to receive the first flow from the first portion of the heat exchanger and direct the first flow from the heat exchanger to outside the apparatus, wherein still in the third flow mode, the second rotary valve is further configured to receive a second flow of the air or gas into the apparatus and direct the second flow to the second portion of the heat exchanger, and the first rotary valve is further configured to receive the second flow from the second portion of the heat exchanger and direct the second flow from the heat exchanger to outside the apparatus. The first rotary valve and the second rotary valve may be configured to form a fourth one of the plurality of predetermined flow modes, wherein in the fourth flow mode, the first rotary valve is configured to receive a first flow of the air or gas into the apparatus and direct the first flow to the second portion of the heat exchanger, and the second rotary valve is configured to receive the first flow from the second portion of the heat exchanger and direct the first flow from the heat exchanger to outside the apparatus, wherein still in the third flow mode, the second rotary valve is further configured to receive a second flow of the air or gas into the apparatus and direct the second flow to the first portion of the heat exchanger, and the first rotary valve is further configured to receive the second flow from the first portion of the heat exchanger and direct the second flow from the heat exchanger to outside the apparatus. The heat exchanger may comprise a first portion and a second portion, wherein the first rotary valve and the second rotary valve may be configured to form a third one of the plurality of predetermined flow modes, wherein in the third flow mode, the first rotary valve is configured to receive a first flow of the air or gas into the apparatus and direct the first flow to the first portion of the heat exchanger, and the second rotary valve is configured to receive the first flow from the first portion of the heat exchanger and direct the first flow from the heat exchanger to outside the apparatus, wherein still in the third flow mode, the second rotary valve is further configured to receive a second flow of the air or gas into the apparatus and direct the second flow to the second portion of the heat exchanger, and the first rotary valve is further configured to receive the second flow from the second portion of the heat exchanger and direct the second flow from the heat exchanger to outside the apparatus. The apparatus may be configured such that the first flow and the second flow do not mix with each other.

Still in the foregoing apparatus, the first rotary valve may be configured to simultaneously receive and direct a first flow and a second flow of the air or gas, wherein the first rotary valve is configured to receive the first flow in a direction substantially parallel to the first axis and direct the first flow in a direction substantially perpendicular to the first axis toward the heat exchanger, wherein the first rotary valve is further configured to receive the second flow from the heat exchanger in a direction substantially perpendicular to the first axis and direct the second flow in a direction substantially parallel to the first axis. The first rotary valve may be configured such that the first flow and the second flow do not mix with each other. The first axis and the second axis may be substantially parallel to each other. The first rotary valve may be configured to rotate in a first rotational direction and at a first rotational speed, wherein the second rotary valve is configured to rotate in a second rotational direction opposite the first rotational direction and at a second rotational speed substantially the same as the first rotational speed.

Yet still in the foregoing apparatus, the apparatus may further comprise an additional heat exchanger comprising a first side and a second side, wherein the additional heat exchanger is configured to allow an air or gas to flow therethrough between the first side and the second side, wherein the additional heat exchanger is further configured to exchange heat with the air or gas flowing therethrough between the first side and the second side, an additional first rotary valve located facing the first side of the additional heat exchanger and configured to rotate about the first axis, wherein the additional first rotary valve is further configured to change flow directions of the air or gas as rotating about the first axis, and an additional second rotary valve located facing the second side of the additional heat exchanger and configured to rotate about the second axis, wherein the additional second rotary valve is further configured to change flow directions as rotating about the second axis, wherein the additional second rotary valve is configured to rotate in synchronization with the additional first rotary valve so as to form the plurality of predetermined flow modes, wherein the heat exchanger, the first rotary valve and the second rotary valve form a first combination, wherein the additional heat exchanger, the additional first rotary valve and the additional second rotary valve form a second combination, wherein the second combination are operable in synchronization with the first combination such that when the first combination is in one of the plurality of predetermined flow modes, the second combination is in the other flow mode of the plurality of predetermined flow modes. The first combination may be in a first one of the plurality of predetermined flow modes, wherein in the first flow mode, the first rotary valve is configured to receive a first flow into the apparatus and direct the first flow of the air or gas to the heat exchanger, and the second rotary valve is configured to receive the first flow from the heat exchanger and direct the first flow from the heat exchanger to outside the apparatus, wherein the second combination is in a second one of the plurality of predetermined flow modes, wherein in the second flow mode, the additional second rotary valve is configured to receive a second flow of the air or gas into the apparatus and direct the second flow to the additional heat exchanger, and the additional first rotary valve is configured to receive the second flow from the additional heat exchanger and direct the second flow from the additional heat exchanger to outside the apparatus. The first rotary valve may be configured to rotate in a first rotational direction and at a first rotational speed, wherein the additional first rotary valve is configured to rotate in a second rotational direction substantially the same as the first rotational direction and at a second rotational speed substantially the same as the first rotational speed. The first rotary valve and the additional first rotary valve may be interconnected to form an integrated rotary valve assembly which is configured to rotate about the first axis.

Further in the foregoing apparatus, the apparatus may further comprise a first blower and a second blower, wherein the first blower is configured to generate a first flow of the air or gas, which enters the first rotary valve and flows toward the second rotary valve, wherein the second blower is configured to generate a second flow of the air or gas, which enters the second rotary valve and flows toward the first rotary valve.

Another aspect of the invention provides a building ventilation system, comprising the foregoing heat exchange apparatus, and wherein the first blower is configured to generate the first flow from an inside of a building to the first rotary valve, wherein the second blower is configured to generate the second flow from an outside of the building to the second rotary valve. In the foregoing system, the first flow and the second flow may be substantially free of mixing with each other.

Yet another aspect of the invention provides a method of operating a heat exchange apparatus, the method comprising: providing the foregoing heat exchange apparatus; and rotating the first and second rotary valves in synchronization with each other so as to form a plurality of predetermined flow modes.

In the foregoing method, providing may comprise installing the apparatus in a building defining an inside and an outside such that the first rotary valve is configured to receive a flow of air or gas from the inside and that the second rotary valve is configured to receive a flow of air or gas from the outside. In a first one of the plurality of predetermined flow modes, the first rotary valve may be configured to receive a flow of the air or gas into the apparatus and direct the flow to the heat exchanger, and the second rotary valve is configured to receive the flow from the heat exchanger and direct the flow from the heat exchanger to outside the apparatus. In a second one of the plurality of predetermined flow modes, the second rotary valve may be configured to receive a flow of the air or gas into the apparatus and direct the flow to the heat exchanger, and the first rotary valve is configured to receive the flow from the heat exchanger and direct the flow from the heat exchanger to outside the apparatus. The heat exchanger may comprise a first portion and a second portion, wherein in a third one of the plurality of predetermined flow modes, the first rotary valve is configured to receive a first flow into the apparatus and direct the first flow to the first portion of the heat exchanger, and the second rotary valve is configured to receive the first flow from the first portion of the heat exchanger and direct the first flow from the heat exchanger to outside the apparatus, wherein still in the third flow mode, the second rotary valve is configured to receive a second flow into the apparatus and direct the second flow to the second portion of the heat exchanger, and the first rotary valve is configured to receive the second flow from the second portion of the heat exchanger and direct the second flow from the heat exchanger to outside the apparatus.

A heat exchanging ventilator, which is spotlighted as an energy-efficient ventilating apparatus in view of new recognition for ventilation, particularly a small-sized heat exchanging ventilator for use in an office or house, is selected and installed in consideration of temperature exchange efficiency, moisture exchange efficiency, enthalpy exchange efficiency, required power consumption, noise, appearance, size, convenience and economy of maintenance, convenience of installation, and the like.

A heat exchanging ventilator employing a rotary type heat exchange apparatus shows superior temperature, moisture and enthalpy exchange efficiencies, but has a great amount of air leakage and a low degree of freedom in view of its appearance, which makes it difficult to enable the ventilator to be slim, and requires a great deal of additional power for rotating a wheel containing a heat exchanging medium or heat exchange apparatus. In addition, since the heat exchanging medium is included in the rotating wheel, it is difficult to dissemble and assemble the heat exchanging medium upon cleaning thereof in use.

A heat exchanging ventilator employing a plate type heat exchange apparatus has a simple structure and the heat exchange apparatus can be easily dissembled and assembled. Moreover, this ventilator requires less power consumption and can be easily slimmed due to its higher degree of freedom in view of its appearance as compared with a ventilator employing a rotary type heat exchange apparatus. However, if maintenance timing is passed during the use thereof, there is an economic burden due to the replacement of the expensive plate type heat exchange apparatus and its economic efficiency deteriorates due to very low temperature, moisture and enthalpy exchange efficiencies, and particularly very low moisture exchange efficiency.

An aspect of the present invention provides a heat exchange apparatus with superior temperature, moisture and enthalpy exchange efficiencies to a rotary type heat exchange apparatus, and a heat exchanging ventilator using the heat exchange apparatus. Another aspect of the present invention provides a heat exchange apparatus with a remarkably smaller amount of air leakage than a rotary type heat exchange apparatus, and a heat exchanging ventilator using the heat exchange apparatus. A further aspect of the present invention provides a heat exchange apparatus in which a heat exchanging medium can be easily disassembled and assembled and which can be made to have a small size and to be easily slimmed, and a heat exchanging ventilator using the heat exchange apparatus. A still further aspect of the present invention provides a heat exchange apparatus having a heat exchanging medium with a structure that ensures easy maintenance in use.

An aspect of the present invention provides a heat exchange apparatus, comprising a first valve member rotating about a first rotational axis; a second valve member rotating about a second rotational axis; and a heat exchanging medium that is positioned on a gas stream path formed between the first valve member and the second valve member, has a channel for enabling gas to pass therethrough, and receives and stores thermal energy from passing hot gas and then transfers the stored thermal energy to passing cold gas, wherein a flow direction of the gas passing through the heat exchanging medium is repeatedly changed as the first and second valve members rotate. The heat exchange apparatus may further comprise first and second guides connected respectively to both sides of the heat exchanging medium and having passages for guiding the gas passing through the heat exchanging medium.

In the heat exchange apparatus, the first valve member may have separate first and second spaces provided therein, and the second valve member may have separate third and fourth spaces provided therein; the first valve member may have first and second radial openings arranged in a circumferential direction of the first rotational axis such that the first radial opening communicates with the first space and the second radial opening communicates with the second space; the second valve member may have third and fourth radial openings arranged in a circumferential direction of the second rotational axis such that the third radial opening communicates with the third space and the fourth radial opening communicates with the fourth space; as the first valve member rotates about the first rotational axis, the first and second radial openings may be alternately connected to the passage of the first guide, gas in the first space may be exhausted out of the first valve member through the first radial opening, and external gas outside the first valve member may be introduced into the second space through the second radial opening; and as the second valve member rotates about the second rotational axis, the third and fourth radial openings may be alternately connected to the passage of the second guide, gas in the third space may be exhausted out of the second valve member through the third radial opening, and external gas outside the second valve member may be introduced into the fourth space through the fourth radial opening.

In the heat exchange apparatus, the first valve member may further include a first inlet opening communicating with the first space and a first outlet opening communicating with the second space, and the second valve member may further include a second inlet opening communicating with the third space and a second outlet opening communicating with the fourth space.

In the heat exchange apparatus, the first inlet opening and the first outlet opening of the first valve member may be provided at both ends thereof on the first rotational axis, and the second inlet opening and the second outlet opening of the second valve member may be provided at both ends thereof on the second rotational axis. In the heat exchange apparatus, the first valve member may have a first partition wall for partitioning the first and second spaces, and the second valve member may have a second partition wall for partitioning the third and fourth spaces. In the heat exchange apparatus, the first and second partition walls may extend while being twisted along the first and second rotational axes, respectively. In the heat exchange apparatus, the first and second partition walls may be twisted in opposite directions.

In the heat exchange apparatus, the first and second valve members may take the shapes of cylinders of which central axes are substantially positioned on the first and second rotational axes, respectively. The heat exchange apparatus may further comprise first and second cylindrical seals surrounding the first and second valve members, respectively. The first cylindrical seal may have an opening connected to the passage of the first guide, and the second cylindrical seal may have an opening connected to the passage of the second guide. The heat exchange apparatus may further comprise a plurality of ring-shaped seals surrounding the first and second cylindrical seals.

In the heat exchange apparatus, at least two heat exchanging media may be provided separately, and the passages of the first and second guides may be formed such that gas passing through the respective heat exchanging media is not mixed with each other. The heat exchange apparatus may further comprise a heat exchanging member constructed by fixing at least two separate heat exchanging media to each other. In the heat exchange apparatus, a plurality of first and second radial openings may be provided in the first valve member along the first rotational axis, and a plurality of third and fourth radial openings may be arranged in the second valve member along the second rotational axis. In the heat exchange apparatus, a plurality of heat exchanging media may be arranged adjacent to one another such that the first and second radial openings correspond to the third and fourth radial openings, and a plurality of separate passages may be provided in the first and second guides so as to correspond to the heat exchanging media. The heat exchange apparatus may further comprise a heat exchanging member constructed by fixing at least two adjacent heat exchanging media to each other. In the heat exchange apparatus, the plurality of heat exchanging media may be arranged at an angle with respect to the gas stream path between the both valve members.

In the heat exchange apparatus, the plurality of radial openings may be arranged while being twisted in one circumferential direction along the first and second rotational axes. In the heat exchange apparatus, the first or second valve member may further include an intermediate inlet opening formed between two radial openings adjacent in an axial direction. In the heat exchange apparatus, the first or second valve member may be configured by subsequently coupling a plurality of unit valves in an axial direction, and each of the unit valves may have two radial openings positioned on one circumference. The heat exchange apparatus may further comprise a housing containing the heat exchanging member, and the housing may have an inlet enabling the heat exchanging member to be inserted and taken out therethrough.

In the heat exchange apparatus, the heat exchanging member may have a rectangular shape. In the heat exchange apparatus, the heat exchanging member may have the channel formed by alternately stacking first and second films with different shapes. In the heat exchange apparatus, the first film may have vertical convexo-concave portions and the second film may be flat. In the heat exchange apparatus, a gap between two adjacent films may be about 0.15 mm to about 0.5 mm, and the channel may have a length of about 20 mm to about 80 mm. In the heat exchange apparatus, the first film may have a corrugated shape and the second film may be flat. In the heat exchange apparatus, the heat exchanging medium may be formed by stacking a plurality of straws each of which at least one channel is formed therein. In the heat exchange apparatus, the channel may have a hydraulic diameter of about 0.3 mm to about 1.5 mm and a length of about 20 mm to about 80 mm. In the heat exchange apparatus, a surface of the film may be coated with a moisture absorbent. In the heat exchange apparatus, the film may be made of any one of plastic, paper and metal. In the heat exchange apparatus, the heat exchanging media may be formed of a non-woven with a porosity of about 80% to about 96% by using heat-retaining fibers with a diameter of about 0.015 mm to about 0.25 mm. In the heat exchange apparatus, surfaces of the heat-retaining fibers may be coated with a moisture absorbent.

The heat exchange apparatus may comprise a driving unit for rotating the first and second valve members. In the heat exchange apparatus, the driving unit of the heat exchange apparatus may comprise a driving motor, and a reduction gear provided with two output shafts for transmitting a rotational force to the valve members. In the heat exchange apparatus, the driving unit of the heat exchange apparatus may further comprise two power transmission units for transmitting the rotational force to the valve members, respectively.

Another aspect of the present invention provides a heat exchanging ventilator comprising the aforementioned heat exchanger; an exhaust blower; and an intake blower. The heat exchanging ventilator may further comprise a case for containing the heat exchange apparatus therein, wherein the case has an intake passage through which external gas outside the case is introduced thereinto, and a filter installed in the intake passage.

According to embodiments of the present invention, first, there is provided a heat exchange apparatus having a heat exchange efficiency superior to that of a rotary type heat exchange apparatus and simultaneously having an advantage in that it can be easily slimmed similarly to a plate type heat exchange apparatus. Second, since it is possible to secure the largest sectional area of a heat exchanging medium in the same space, the efficiency of the heat exchange apparatus can be maximized and a heat exchanging ventilator can be easily made to have a small size. Third, the heat exchanging medium can be easily dissembled and assembled, and a contaminated heat exchanging medium can be cleaned and used repeatedly, thereby reducing maintenance costs. Fourth, since a heat exchanging medium, that is not easily employed in a small-sized rotary type heat exchange apparatus but represents reduced production costs and superior performance, can be used in embodiments of the present invention, it is possible to extend fields to which the heat exchanging medium is applicable. Fifth, since it is possible to minimize the amount of air leakage so as to maximize heat exchange efficiency and the amount of effective outdoor intake air can be increased, thereby ultimately facilitating improvement of the performance of the heat exchange apparatus. Sixth, since there is no need for manufacture of a relatively larger wheel contrary to a rotary type heat exchange apparatus, production costs are reduced.

DETAILED DESCRIPTION OF EMBODIMENTS

Hereinafter, embodiments of the present invention will be described in detail with reference to the accompanying drawings.

Figure 1:
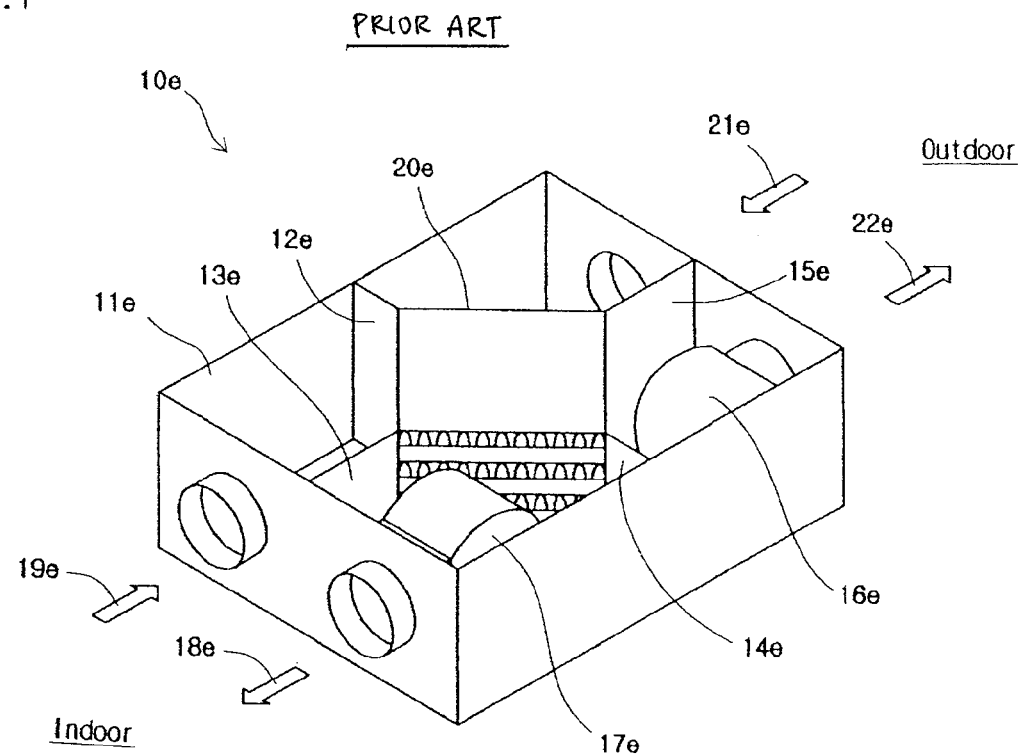
FIG. 1 is a perspective view showing an example of exemplary heat exchanging ventilators.
Figure 2:
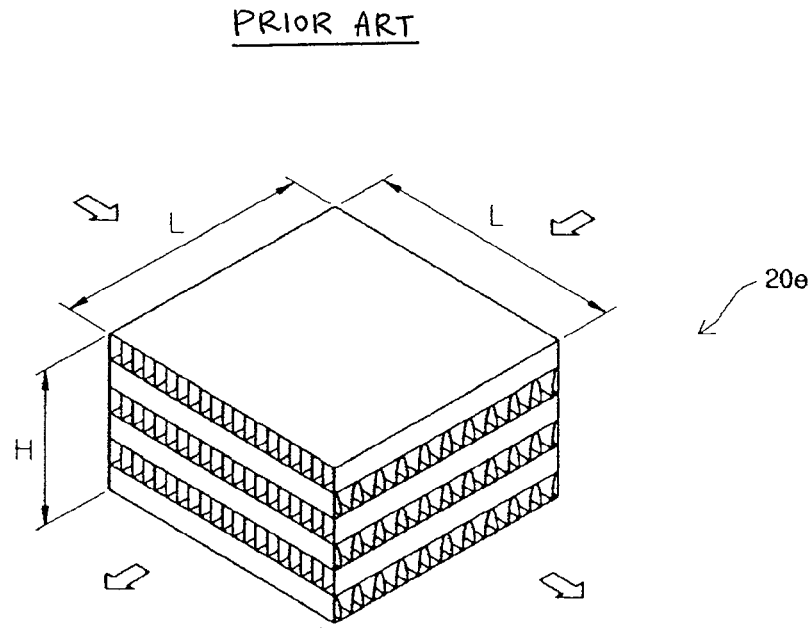
FIG. 2 is a perspective view of a plate type heat exchange apparatus provided in the heat exchanging ventilator shown in FIG. 1.
Figure 3:
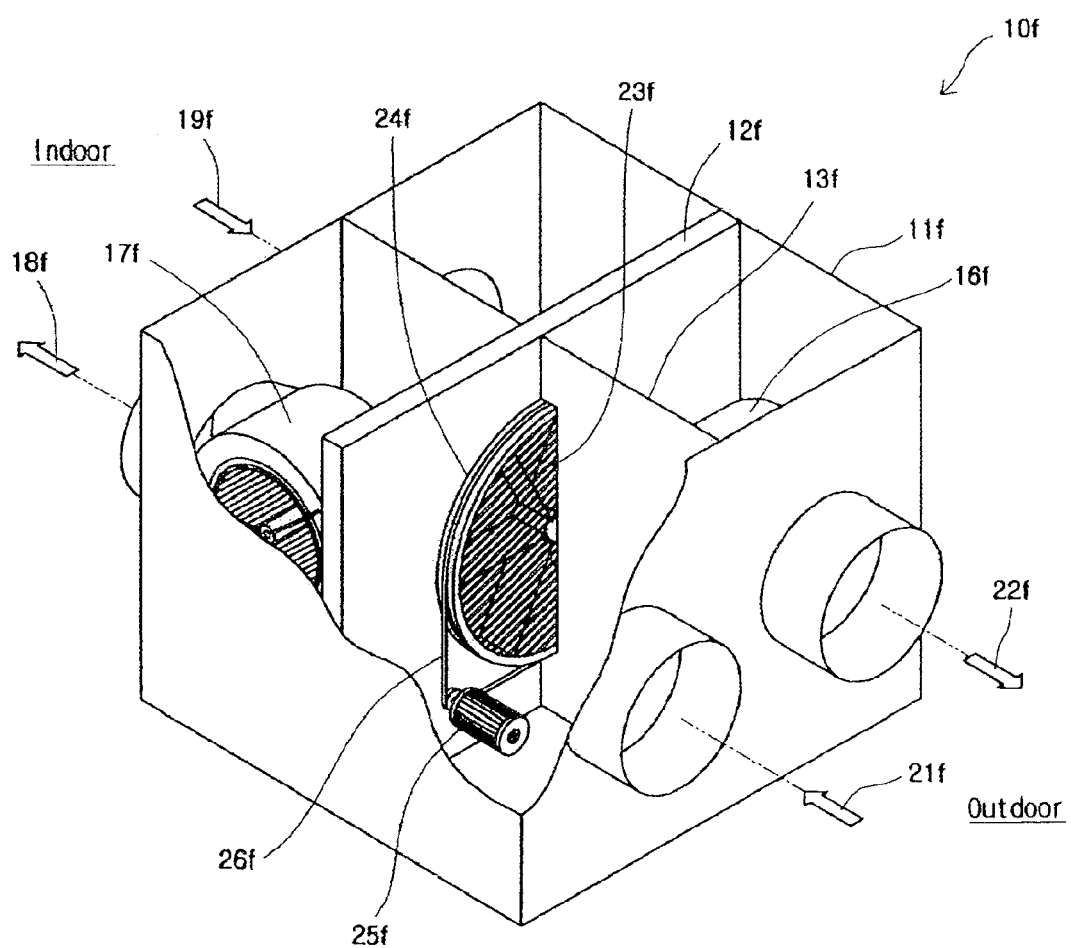
FIG. 3 is a perspective view showing another example of exemplary heat exchanging ventilators.
Figure 4:
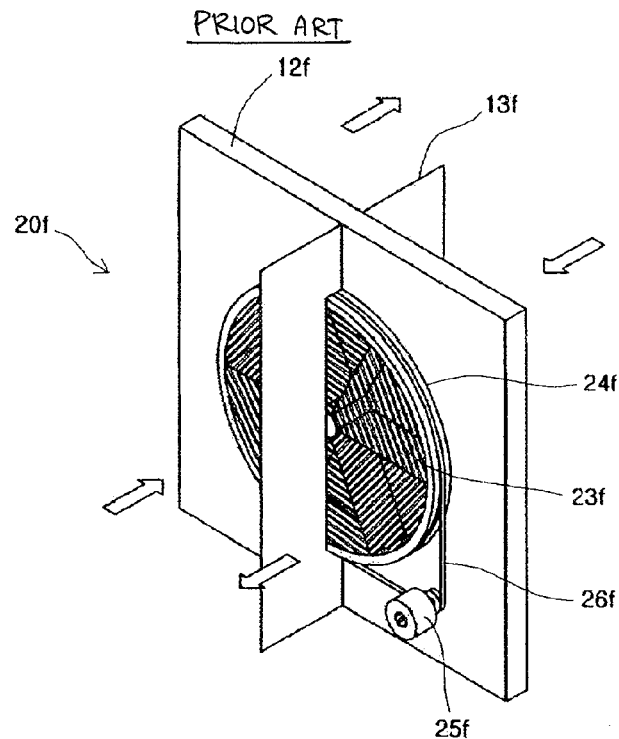
FIG. 4 is a perspective view of a rotary type heat exchange apparatus provided in the heat exchanging ventilator shown in FIG. 3.
Figure 5:
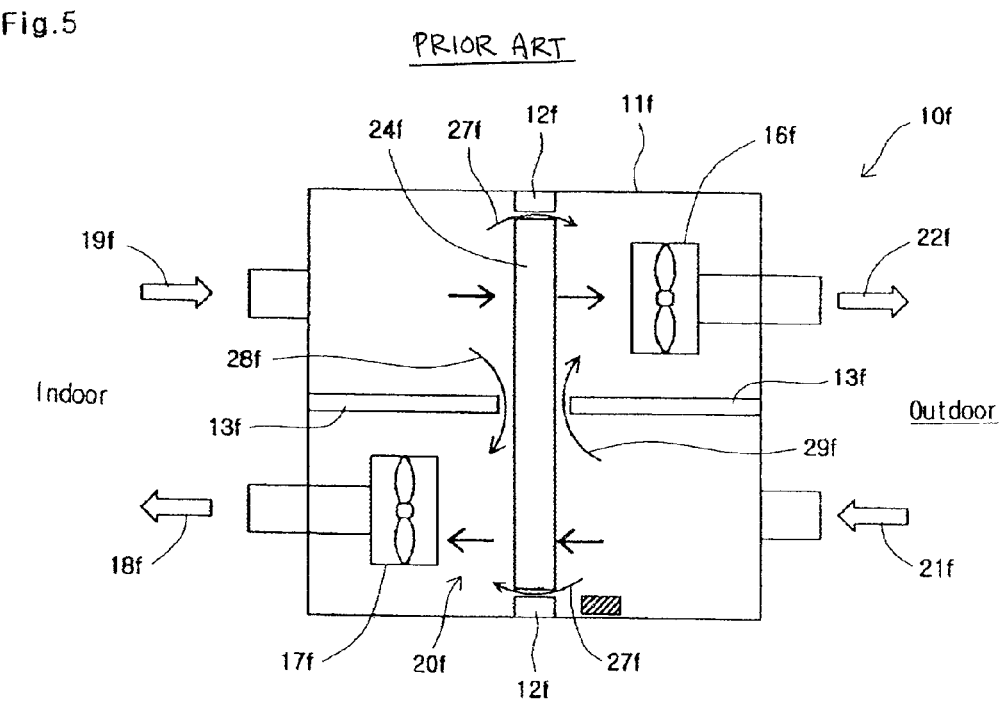
FIG. 5 is a plan view schematically showing an operational state of the heat exchanging ventilator of FIG. 3.
Figure 6:
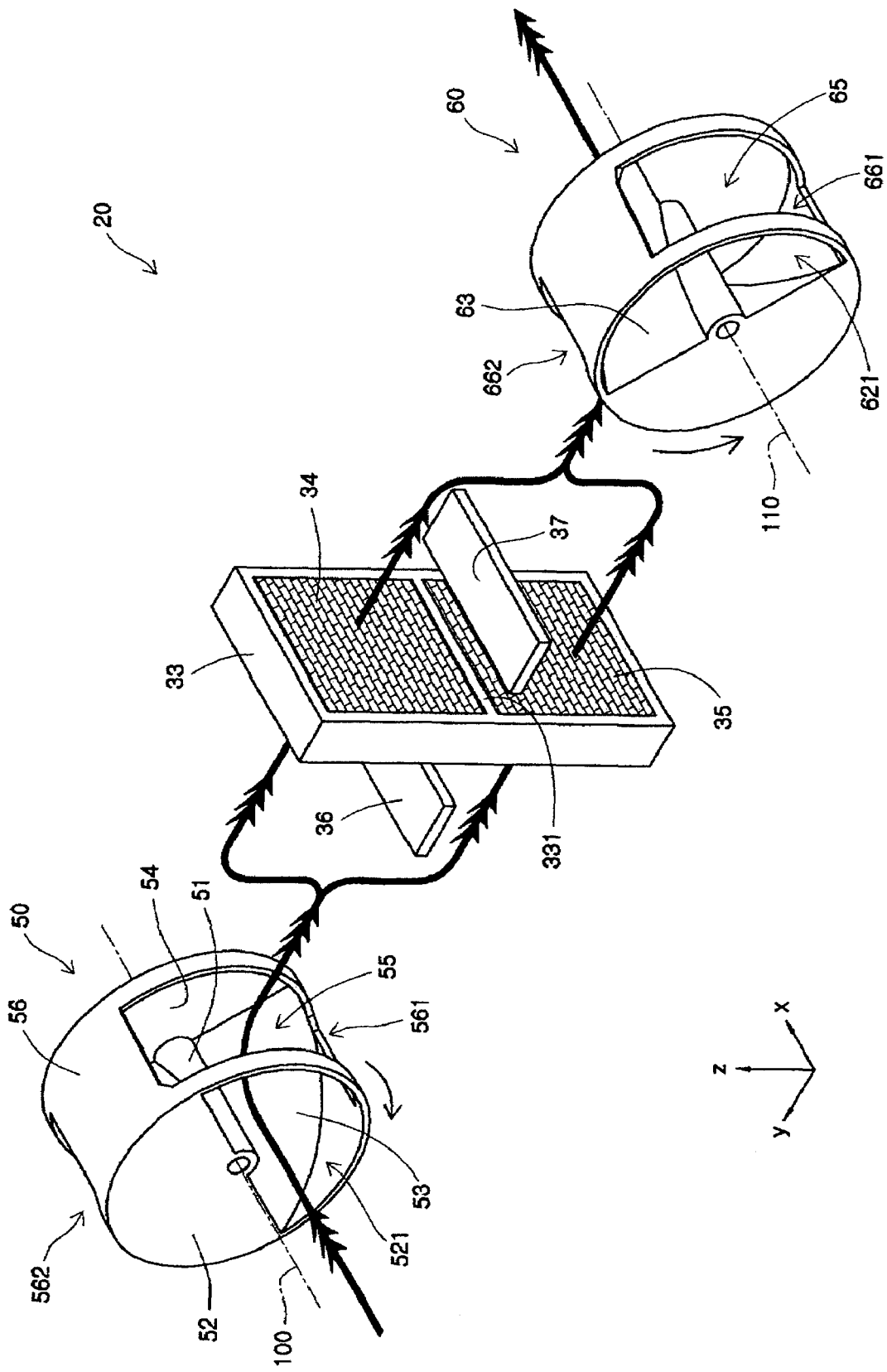
FIGS. 6 to 9 show respective operational stages of main parts of a heat exchange apparatus according to an embodiment of the present invention.

FIGS. 6 to 9 show respective operational stages of main parts of a heat exchange apparatus according to an embodiment of the present invention. Referring to FIG. 6, a heat exchange apparatus 20 includes a heat exchanging member 33, a first partition plate 36, a second partition plate 37, a first valve member 50, and a second valve member 60. The first and second valve members 50 and 60 rotate, respectively, about first and second rotational axes 100 and 110 that are parallel to each other. The heat exchanging member 33 is positioned between the first and second valve members 50 and 60. The first and second partition plates 36 and 37 are positioned, respectively, near the first and second valve members 50 and 60 in a state where the heat exchanging member 33 is interposed between the partition plates. For the sake of convenience of explanation, an x-y-z Cartesian coordinate system is employed. A direction in which the first and second rotational axes 100 and 110 extend is set as an x-axis, and a direction perpendicular to the x-axis in which the second valve member 60, the heat exchanging member 33 and the first valve member 50 are arranged is set as a y-axis, and the remaining direction perpendicular to the x and y-axes is set as a z-axis.

The heat exchanging member 33 takes the shape of a rectangular plate and is arranged to be substantially orthogonal to the y-axis. The heat exchanging member 33 includes a first heat exchanging medium or heat exchanger 34 and a second heat exchanging medium or heat exchanger 35. The first and second heat exchanging media 34 and 35 are separated by a border portion 331 formed between the heat exchanging media 34 and 35, and are arranged along the z-axis. Two spaces divided by the heat exchanging members 33 communicate with each other through the heat exchanging media 34 and 35. The structures of the heat exchanging media 34 and 35 are shown in detail in FIGS. 10 (a) and (b).

Figure 10:
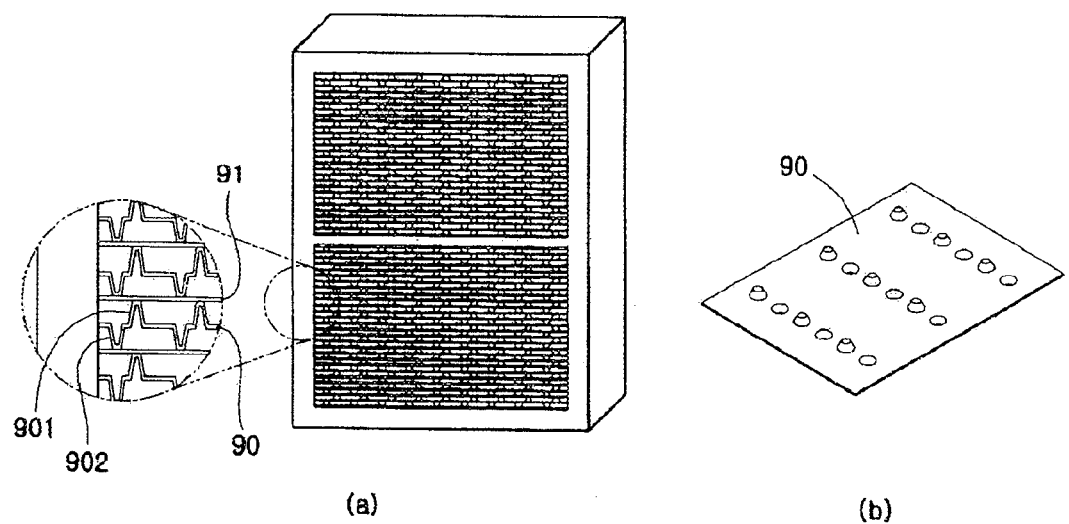
FIG. 10 is an enlarged view of a heat exchanging medium shown in FIG. 6.

Referring to FIG. 10, the heat exchanging media are formed by alternately stacking a plurality of first and second films 90 and 91, which are made of plastic, paper, metal or the like, one above another. The first film 90 includes a plurality of first and second protrusions 901 and 902 which protrude in opposite directions to form convexo-concave portions. The second film 91 is flat. Since these two kinds of films 90 and 91 thus configured are alternately stacked one above another, gaps are defined between the films 90 and 91 to serve as channels through which air can flow. The gaps defined between the films have a gap height of about 0.15 mm to about 0.5 mm and a gap length of about 20 mm to about 80 mm measured in an air moving direction in order to minimize pressure loss generated when air passes through the gaps as well as to maintain suitable heat exchange efficiency, i.e. a temperature exchange efficiency of about 80% to about 98%. The films 90 and 91 constituting the heat exchanging media are configured in such a manner that they are not fixed to each other except both ends thereof. Thus, even though contaminants are accumulated in the gaps, they can be easily removed if the heat exchanging media are disassembled from the heat exchange apparatus. Further, a moisture absorbent may be coated on a surface of the film, if necessary, to improve moisture exchange efficiency.

Figure 11:
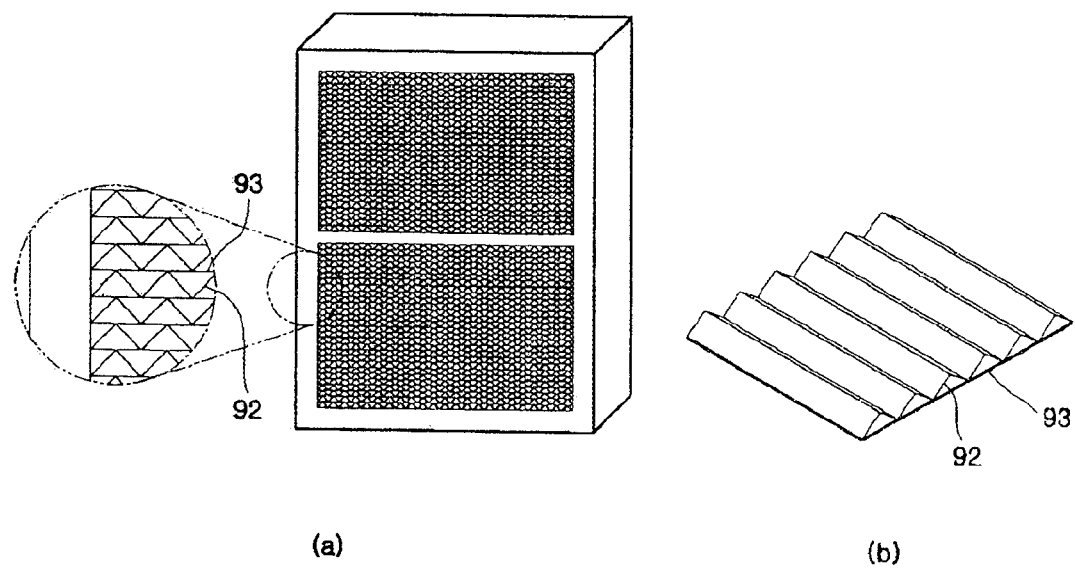
FIG. 11 is a view showing another example of the heat exchanging medium of FIG. 10.

FIG. 11 shows another embodiment of a heat exchanging media. Referring to FIGS. 11 (a) and (b), the heat exchanging media are formed by alternately stacking first zigzag-corrugated films 92 and second flat films 93 one above another in order to form channels through which air can pass. In order to maintain the sectional shape of the channel, the first and second films 92 and 93 are fixed to each other. Each of the channels has a hydraulic diameter of about 0.3 mm to about 1.5 mm and a length of about 20 mm to about 80 mm to minimize pressure loss generated when air passes through the channels as well as to maintain suitable heat exchange efficiency, i.e. a temperature exchange efficiency of about 80% to about 98%. Further, a moisture absorbent may be coated on a surface of the film, if necessary, to improve moisture exchange efficiency.

In addition to the heat exchanging media shown in FIGS. 10 and 11, a non-woven heat exchanging medium or heat exchanger having a porosity of about 80% to about 96% can maintain a temperature exchange efficiency of about 80% to about 98% by using heat-retaining fibers with a diameter of about 0.015 mm to about 0.25 mm, and thus, it can also be used as a heat exchanging medium of the heat exchange apparatus according to an embodiment of the present invention. Although there is a problem in that the non-woven heat exchanging medium is difficult to clean when it is contaminated, the non-woven heat exchanging medium can be manufactured at low cost and thus may be efficiently used one or two times as a heat exchanging medium.

In addition, a heat exchanging medium formed by stacking a plurality of straws one above another may be also used. At this time, it will be easily understood by those skilled in the art that the straws may be configured to include a plurality of passages therein.

However, the heat exchanging medium used in an embodiment of the present invention is not limited to those shown in FIGS. 10 and 11. It is understood by those skilled in the art that the other types of heat exchanging media may also be used.

Referring again to FIG. 6, the first and second partition plates 36 and 37 are arranged in a state where the heat exchanging member 33 is interposed therebetween. The partition plates extend from the border portion 331 between the first and second heat exchanging media 34 and 35 such that air passing through the first heat exchanging media 34 of the heat exchanging member 33 cannot be mixed with air passing through the second heat exchanging media 35. Although it has been shown in this figure that each of the two partition plates 36 and 37 is separated from each of the two valve members 50 and 60 and the heat exchanging member 33, each of the two partition plates 36 and 37 is substantially brought into contact with each of the two valve members 50 and 60 and the heat exchanging member 33. The first and second valve members 50 and 60 are arranged, respectively, at both sides of the heat exchanging member 33 and the first and second partition plates 36 and 37. One of the two valve members 50 and 60 which is positioned near the first partition plate 36 is a first valve member 50 and the other of the two valve members 50 and 60 which is positioned near the second partition plate 37 is a second valve member 60. The first and second valve members 50 and 60 take the shapes of cylinders and rotate in opposite directions about the first and second rotational axes 100 and 110 which are parallel to each other. Central axes of the first and second cylindrical valve members 50 and 60 become the first and second rotational axes 100 and 110, respectively.

Figure 7:
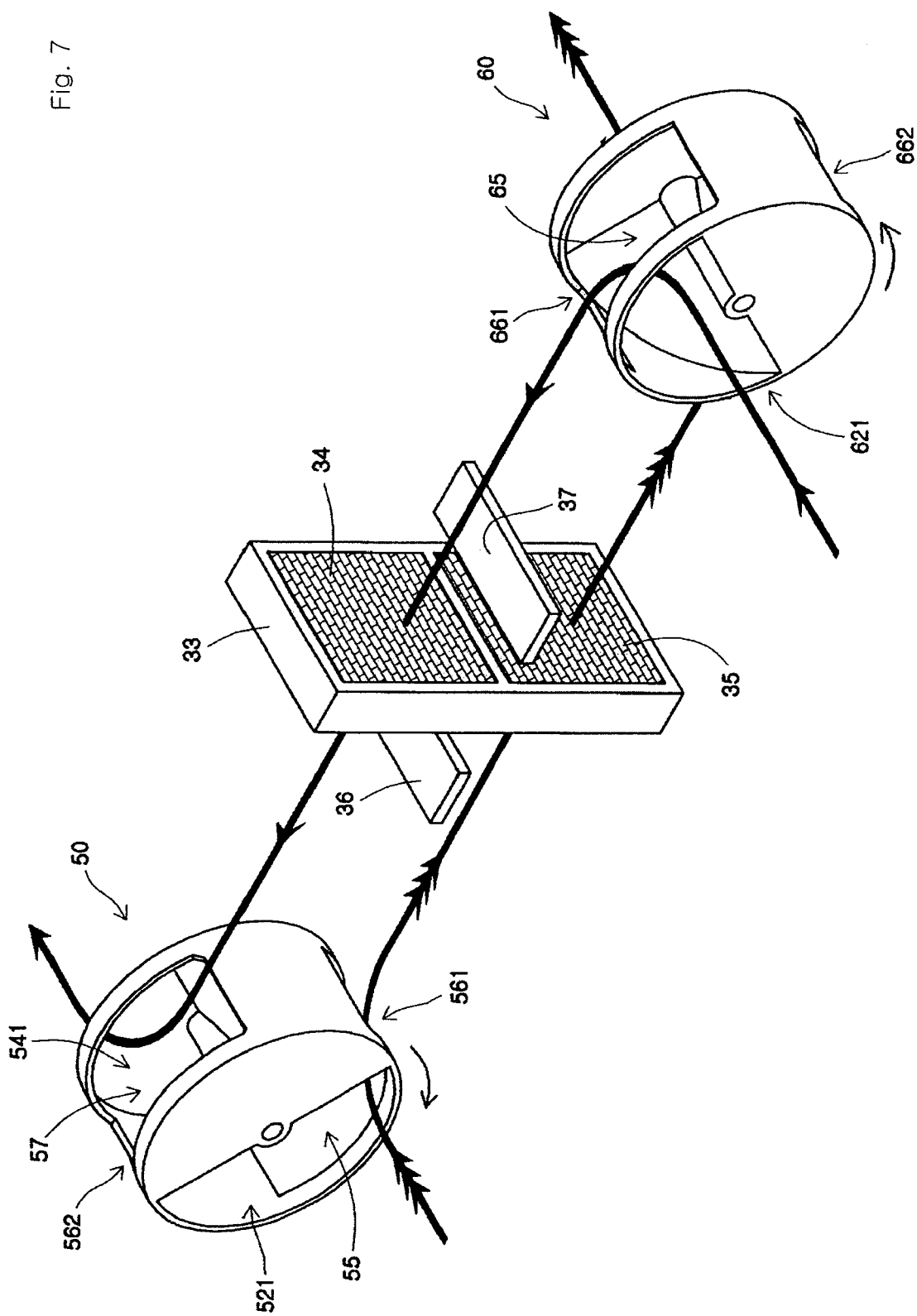

Referring to FIGS. 6 and 7, the first valve member 50 is hollow and includes a first end wall 52, a second end wall 54, and a side wall 56 that connects the two end walls 52 and 54 and defines a circumferential surface. A boss 51 extending along the first rotational axis 100 and a separation blade 53 twisted by 90 degrees in the form of a screw along the first rotational axis 100 are prepared within the first valve member 50. A rotational shaft (not shown) is fitted in and coupled with the boss 51 to impart a rotational force to the boss 51. An inner space of the valve member 50 is divided into a first space 55 and a second space 57 by means of the separation blade 53. A first semicircular axial inlet opening 521 communicating with the first space 55 is formed in the first end wall 52, and a first semicircular axial outlet opening 541 communicating with the second space 57 is formed in the second end wall 54. A first radial opening 561 communicating with the first space 55 and a second radial opening 562 communicating with the second space 57 are formed in the side wall 56. The first and second radial openings 561 and 562 are arranged at an angular interval of 180 degrees. In this connection, as the first valve member 50 rotates about the first rotational axis 100, air is introduced into the first space 55 through the first axial inlet opening 521 and then exhausted through the first radial opening 561 and air is also introduced into the second space 57 through the second radial opening 562 and then exhausted through the first axial outlet opening 541. Since the second valve member 60 has the same configuration as the first valve member except that a separation blade 63 is twisted in a direction opposite to the separation blade 53 of the first valve member 50, detailed description thereof will be omitted herein. As the second valve member 60 rotates about the second rotational axis 110, air is introduced into a third space 65 through a second axial inlet opening 621 and then exhausted through a third radial opening 661 and air is also introduced into a fourth space 67 (see FIG. 9) through a fourth radial opening 662 and then exhausted through a second axial outlet opening 641 (see FIG. 9).

FIGS. 6 to 9 schematically show main parts of the heat exchange apparatus in order to explain the principle of an embodiment of the present invention. Although it has not been shown in FIGS. 6 to 9, the heat exchange apparatus 20 may include a guide for maintaining an air stream formed between the two valve members 50 and 60 and the heat exchanging member 33, which will be fully understood with reference to FIGS. 12 to 14 to be described later.

Now, the operation of the first embodiment of the heat exchange apparatus according to an embodiment of the present invention will be described with reference to FIGS. 6 to 9. Hereinafter, assume that an area where the first valve member 50 is located is set as the inside of a room, and an area where the second valve member 60 is located is set as the outside of a room. In addition, indoor air is assumed to have relatively higher temperature and absolute humidity than outdoor air. First, referring to FIG. 6, the first radial opening 561 of the first valve member 50 and the fourth radial opening 662 of the second valve member 60 face both sides of the heat exchanging member 33. At this time, the first and second valve members 50 and 60 are synchronously rotated in opposite directions at the same speed, respectively. A hot exhaust air stream in a room is introduced into the first space 55 in the first valve member 50 through the first axial inlet opening 521 and then exhausted to the heat exchanging member 33 through the first radial opening 561. The air exhausted through the first radial opening 561 of the first valve member 50 is divided into two air streams by the first partition plate 36, which in turn pass through the first and second heat exchanging media 34 and 35 of the heat exchanging member 33, respectively. At this time, the hot exhaust air streams passing through the first and second heat exchanging media 34 and 35 transfer thermal energy and moisture to the first and second heat exchanging media 34 and 35, respectively, and become cold exhaust air streams which in turn are introduced into the fourth space 67 of the second valve member 60 through the fourth radial opening 662 of the second valve member 60. Then, the cold exhaust air streams are exhausted to the outside of a room through the second axial outlet opening 641. In such a state, if the first and second valve members 50 and 60 are rotated further by 90 degrees in opposite directions, the heat exchange apparatus is in a state shown in FIG. 7.

Referring to FIG. 7, by means of the first and second partition plates 36 and 37, the first heat exchanging medium 34 communicates with the second radial opening 562 of the first valve member 50 and the third radial opening 661 of the second valve member 60 and the second heat exchanging medium 35 communicates with the first radial opening 561 of the first valve member 50 and the fourth radial opening 662 of the second valve member 60. An air stream passing through the first heat exchanging medium 34 is opposite to the case shown in FIG. 6. That is, a cold intake air stream in the room is introduced into the third space 65 in the second valve member 60 through the second axial inlet opening 621 of the second valve member 60 and passes through the first heat exchanging medium 34 via the third radial opening 661. At this time, the air receives thermal energy and moisture stored in the first heat exchanging medium 34 and then becomes a hot intake air stream. The hot intake air stream passing through the first heat exchanging medium 34 is introduced into the second space 57 in the first valve member 50 through the second radial opening 562 of the first valve member 50 and then exhausted through the first axial outlet opening 541 to the inside of the room. An air stream passing through the second heat exchanging medium 35 is the same as the case shown in FIG. 6. That is, a hot exhaust air stream in the room is introduced into the first space 55 in the first valve member 50 through the first axial inlet opening 521 of the first valve member 50 and passes through the second heat exchanging medium 35 through the first radial opening 561. At this time, the hot exhaust air stream transfers thermal energy and moisture to the second heat exchanging medium 35 and then becomes a cold exhaust air stream. The cold exhaust air stream passing through the second heat exchanging medium 35 is introduced into the fourth space 67 (see FIG. 9) in the second valve member 60 through the fourth radial opening 662 of the second valve member 60 and then exhausted to the outside of the room through the second axial outlet opening 641 (see FIG. 9). In such a state, if the first and second valve members 50 and 60 are rotated further by 90 degrees in opposite directions, respectively, the heat exchange apparatus is in a state shown in FIG. 8.

Figure 8:
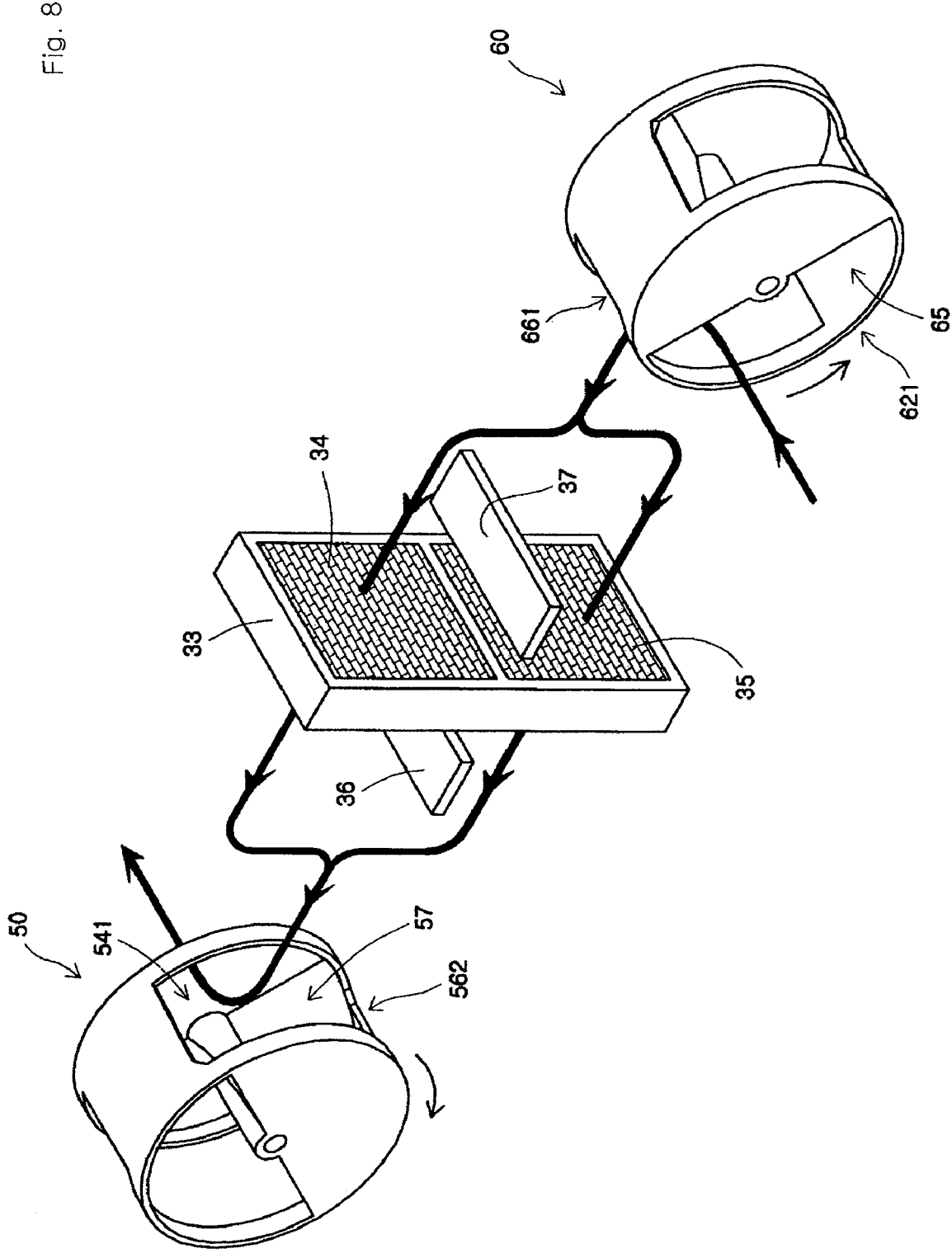

Referring to FIG. 8, the second radial opening 562 of the first valve member 50 and the third radial opening 661 of the second valve member 60 face both sides of the heat exchanging member 33, respectively. A cold intake air stream in the room is introduced into the third space 65 in the second valve member 60 through the second axial inlet opening 621 and then exhausted to the heat exchanging member 33 through the third radial opening 661. The cold intake air stream exhausted through the third radial opening 661 of the second valve member 60 is divided into two air streams by the second partition plate 37 which in turn pass through the first and second heat exchanging media 34 and 35, respectively. At this time, the cold intake air streams passing through the first and second heat exchanging media 34 and 35 receive thermal energy and moisture stored in the first and second heat exchanging media 34 and 35 and then become a hot intake air stream which in turn is introduced into the second space 57 of the first valve member 50 through the second radial opening 562 of the first valve member 50. The hot intake air stream introduced into the second space 57 of the first valve 50 is exhausted through the first axial outlet opening 541 to the outside of the room. That is, an air stream is opposite to the case shown in FIG. 6. In such a state, if the first and second valve members 50 and 60 are rotated further by 90 degrees in opposite directions, respectively, the heat exchange apparatus is in a state shown in FIG. 9.

Figure 9:
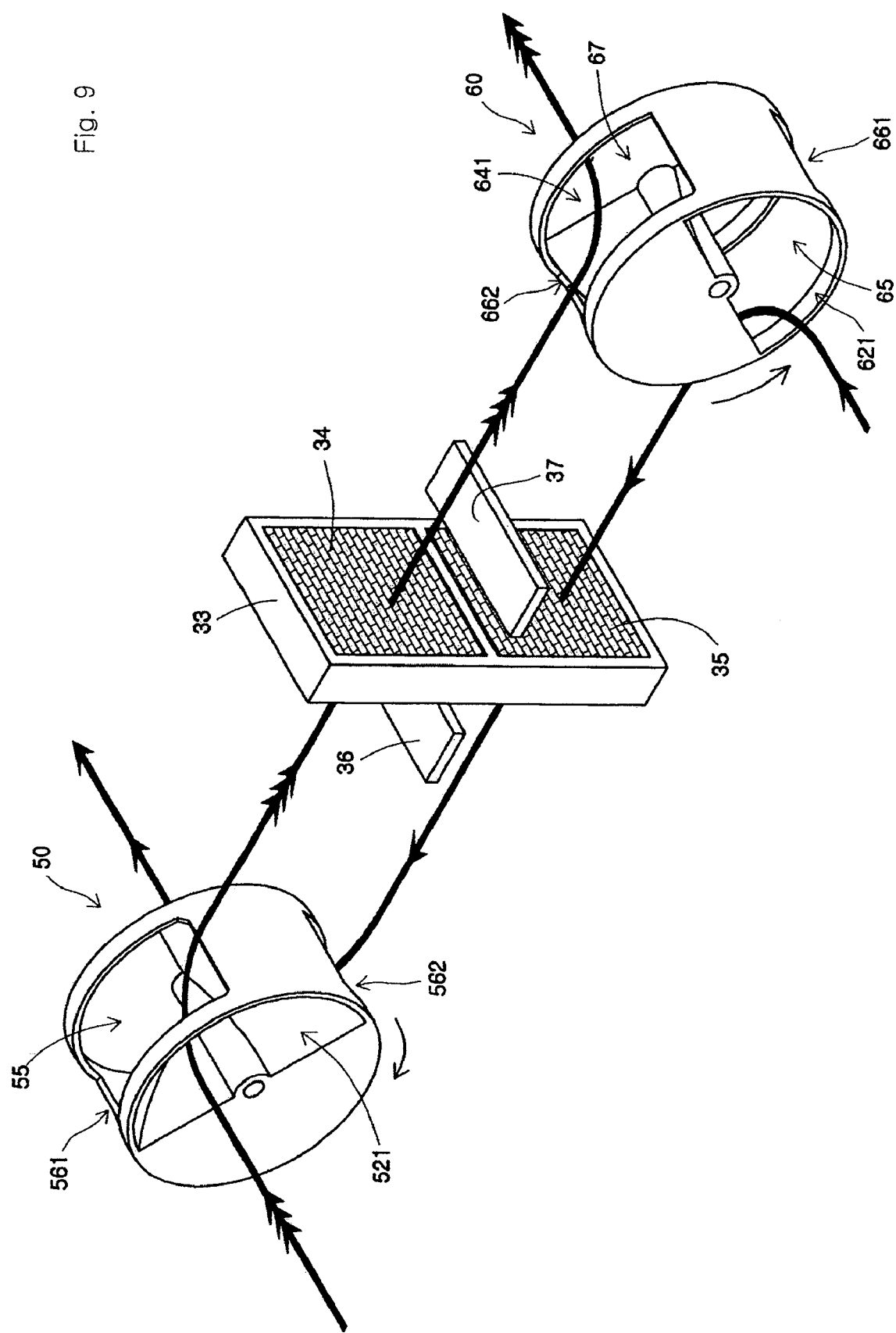

Referring to FIG. 9, by means of the first and second partition plates 36 and 37, the first heat exchanging medium 34 communicates with the first radial opening 561 of the first valve member 50 and the second radial opening 662 of the second valve member 60, and the second heat exchanging medium 35 communicates with the second radial opening 562 of the first valve member 50 and the first radial opening 661 of the second valve member 60. An air stream passing through the first and second heat exchanging media 34 and 35 is opposite to the case shown in FIG. 7. That is, a hot exhaust air stream in the room is introduced into the first space 55 in the first valve member 50 through the first axial inlet opening 521 of the first valve member 50 and then passes through the first heat exchanging medium 34 via the first radial opening 561. At this time, the air introduced into the first space 55 transfers thermal energy and moisture to the first heat exchanging medium 34 and then becomes a cold exhaust air stream. The cold exhaust air stream passing through the first heat exchanging medium 34 is introduced into the fourth space 67 in the second valve member 60 through the fourth radial opening 662 of the second valve member 60, and then exhausted to the outside of the room through the second axial outlet opening 641. In addition, a cold intake air stream in the room is introduced into the third space 65 in the second valve member 60 through the second axial introduction space 621 of the second valve member 60 and then passes through the second heat exchanging medium 35 via the third radial opening 661. At this time, the cold intake air stream introduced into the third space 65 receives thermal energy and moisture stored in the second heat exchanging medium 35 and then becomes a hot intake air stream. The hot intake air stream passing through the second heat exchanging medium 35 is introduced into the second space 57 (see FIG. 7) in the first valve member 50 through the second radial opening 562 of the first valve member 50 and then exhausted through the first axial outlet opening 541 (see FIG. 7) to the outside of the room.

While the processes shown in FIGS. 6 to 9 are repeated, the indoor air in a region where the first valve member 50 is located is ventilated and the thermal energy and moisture are transferred to the introduced outdoor air. As shown in FIGS. 6 to 9, although the two heat exchanging media are not movable, the intake and exhaust of air through the heat exchanging media 34 and 35 are alternately changed due to the two valve members 50 and 60 that are synchronously rotated in opposite directions. Thus, the heat exchange can be performed in the same way as a rotary type heat exchange apparatus. However, there is a disadvantage in that the flow rate may be abruptly changed depending on rotating positions of both the valve members 50 and 60. Therefore, there is a need for a structure for complementing the above disadvantage, i.e. for regulating a uniform flow rate regardless of the rotating positions of the valve members. A heat exchange apparatus including such a structure is proposed as an embodiment of the present invention.

Figure 12:
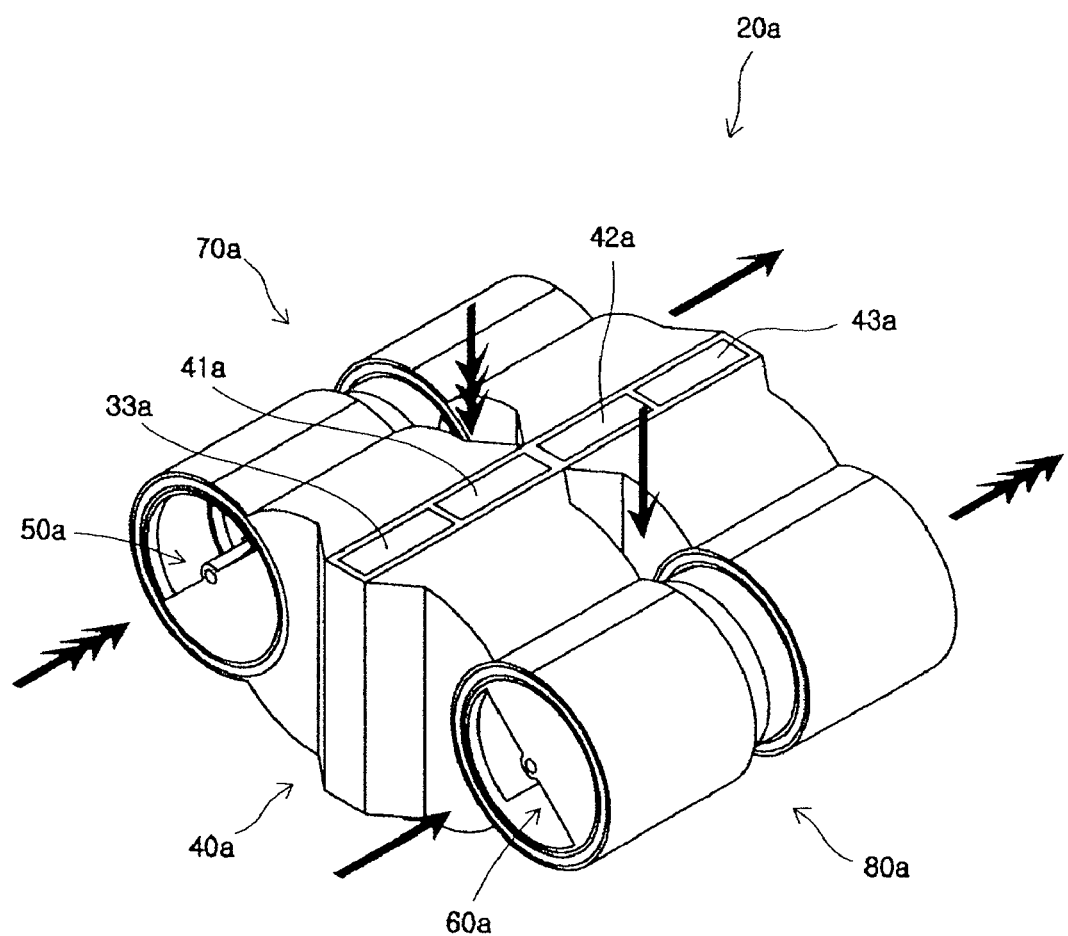
FIG. 12 is a perspective view of a heat exchange apparatus according to an embodiment of the present invention.
Figure 13:
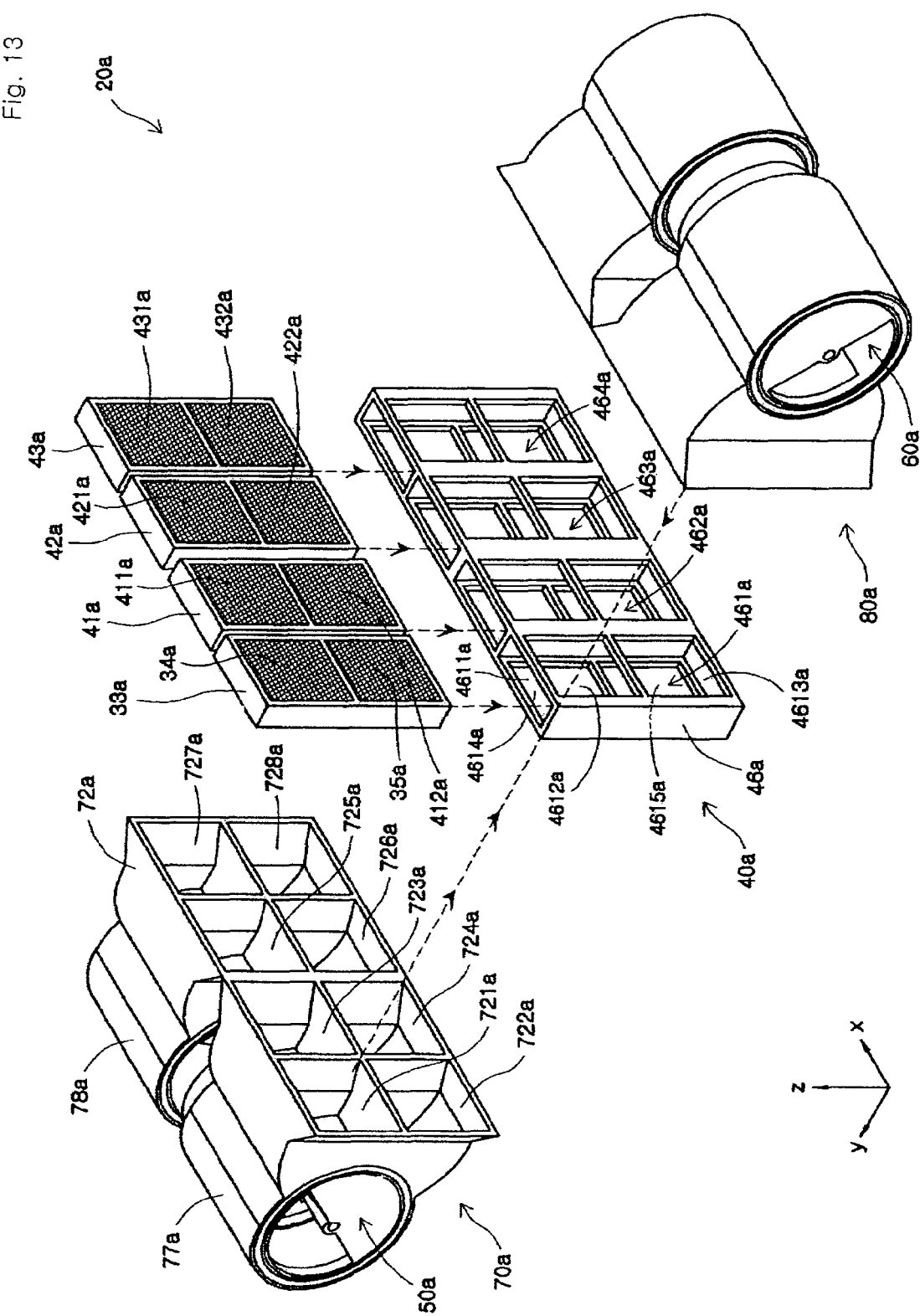
FIG. 13 is an exploded perspective view showing the heat exchange apparatus of FIG. 12.

FIGS. 12 to 16 show a heat exchange apparatus according to an embodiment of the present invention. Referring to FIGS. 12 and 13, a heat exchange apparatus 20a includes a heat exchanging unit 40a having first, second, third and fourth heat exchanging members 33a, 41a, 42a and 43a; a first air distribution unit 70a having a first valve member 50a; and a second air distribution unit 80a having a second valve member 60a. The first and second air distribution units 70a and 80a are arranged at opposite sides of the heat exchanging unit 40a in a state where the heat exchanging unit 40a is interposed between the air distribution units 70a and 80a. An x-y-z Cartesian coordinates system is employed in the same way as the discussed embodiment of the present invention. The heat exchanging unit 40a includes the first, second, third and fourth heat exchanging members 33a, 41a, 42a and 43a, and a housing 46a. Since the first, second, third and fourth heat exchanging members 33a, 41a, 42a and 43a are configured in the same manner as the heat exchanging member 33 (see FIG. 6) of the first embodiment, the detailed description thereof will be omitted herein. The housing 46a includes first, second, third and fourth receiving chambers 461a, 462a, 463a and 464a that are sequentially arranged along the x-axis. The first heat exchanging member 33a can be tightly fitted in the first receiving chamber 461a that is provided with an inlet 4611a, through which the first heat exchanging member 33a can be fitted and released, at an end thereof in the z-axis. Side openings 4612a, 4613a, 4614a and 4615a are defined in opposite sides of the first receiving chamber 461a (at sides facing the first and second air distribution units 70a and 80a, respectively) such that the two heat exchanging media 34a and 35a of the received first heat exchanging member 33a can be exposed. Since the second, third and fourth receiving chambers 462a, 463a and 464a are configured in the same manner as the first receiving chamber 461a, the detailed description thereof will be omitted herein. The second, third and fourth heat exchanging members 41a, 42a and 43a are fitted in the second, third and fourth receiving chambers 462a, 463a and 464a, respectively. Such a configuration of the heat exchanging unit 40a allows the heat exchanging members 33a, 41a, 42a and 43a to be easily replaced.

Figure 14:
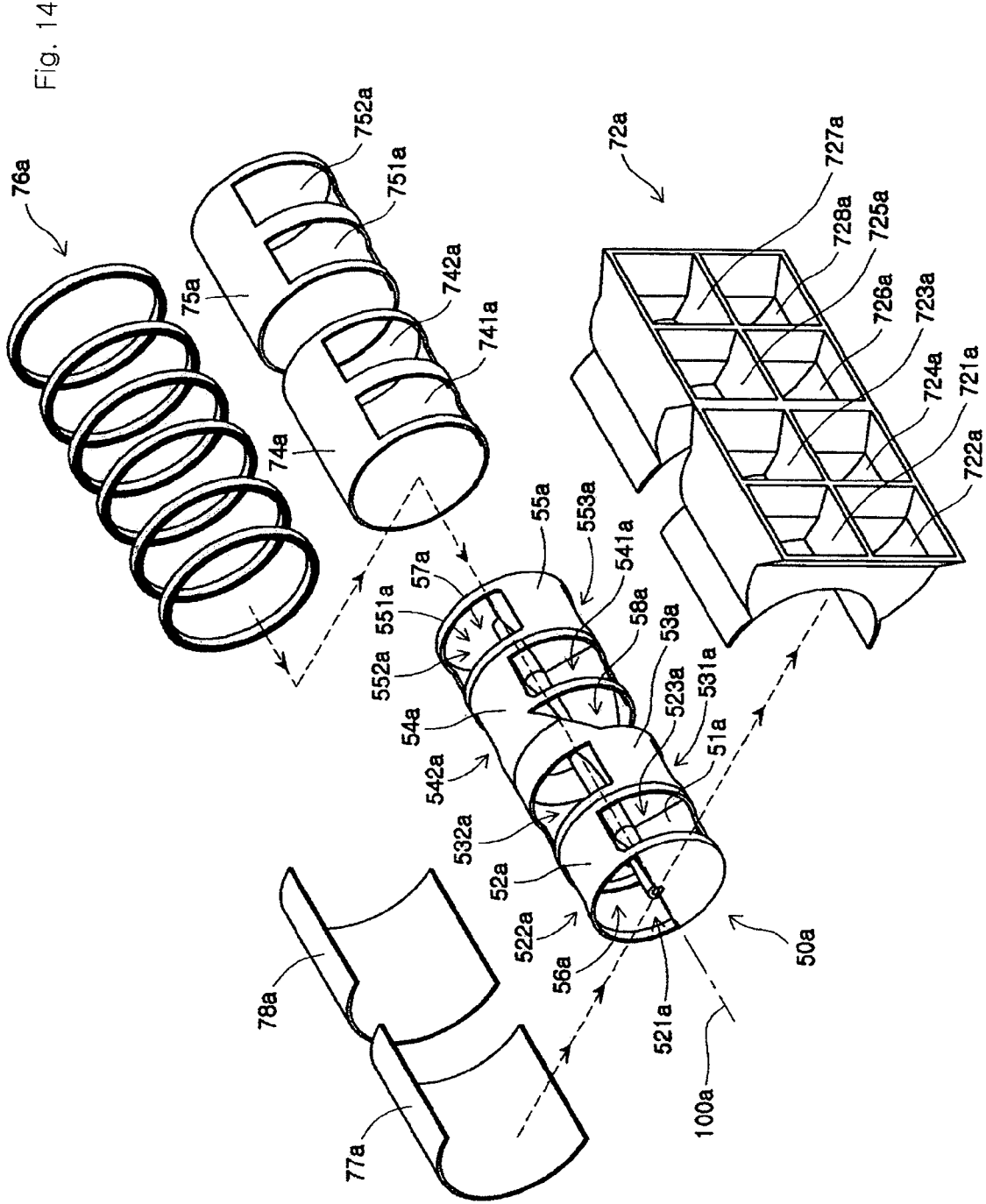
FIG. 14 is an exploded perspective view showing a first air distribution unit provided in the heat exchange apparatus of FIG. 13.
Figure 15:
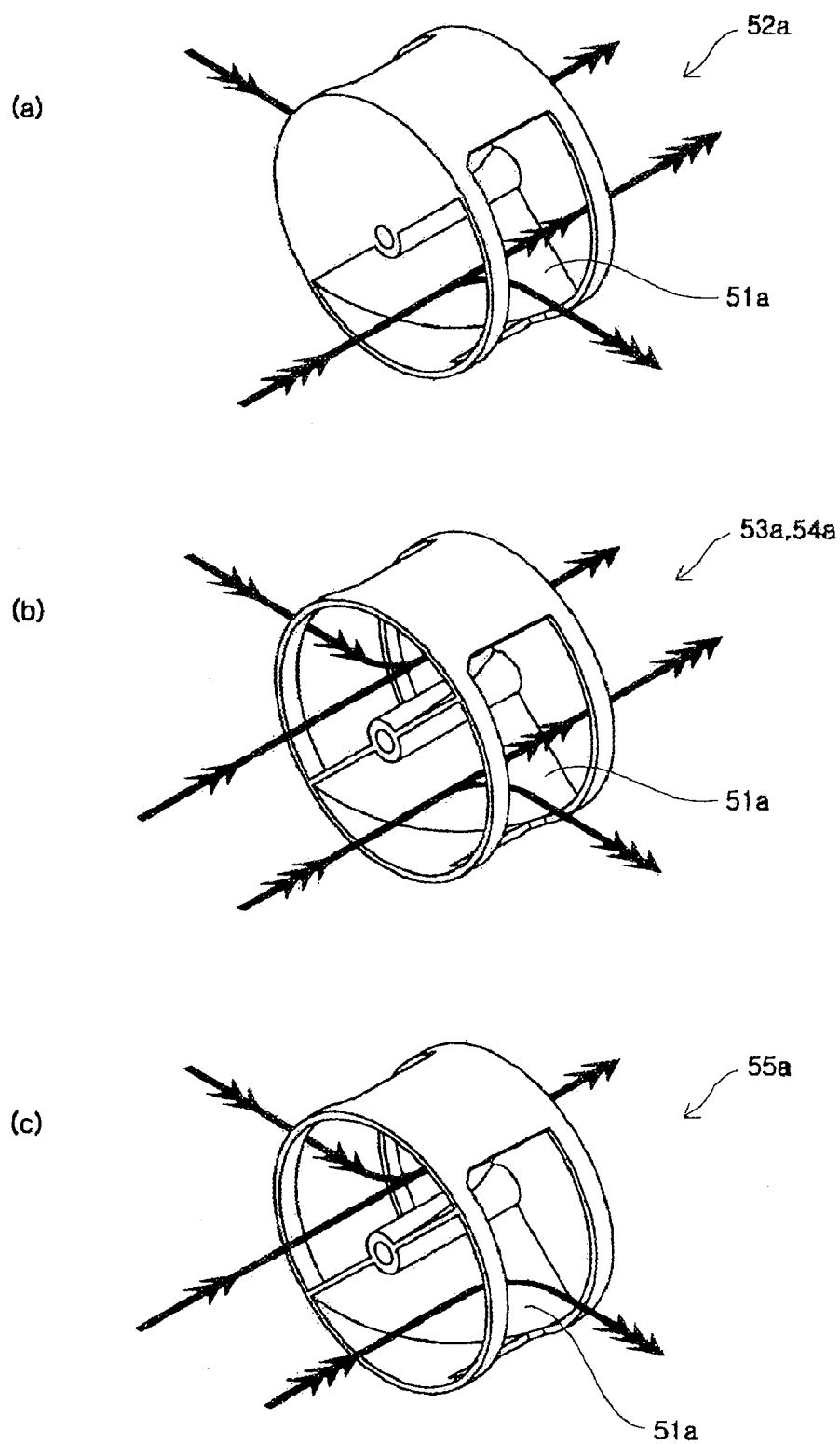
FIGS. 15 (a) to (c) are perspective views showing three kinds of unit valves, which are used for a valve member provided in the heat exchange apparatus of FIG. 14.
Figure 16:
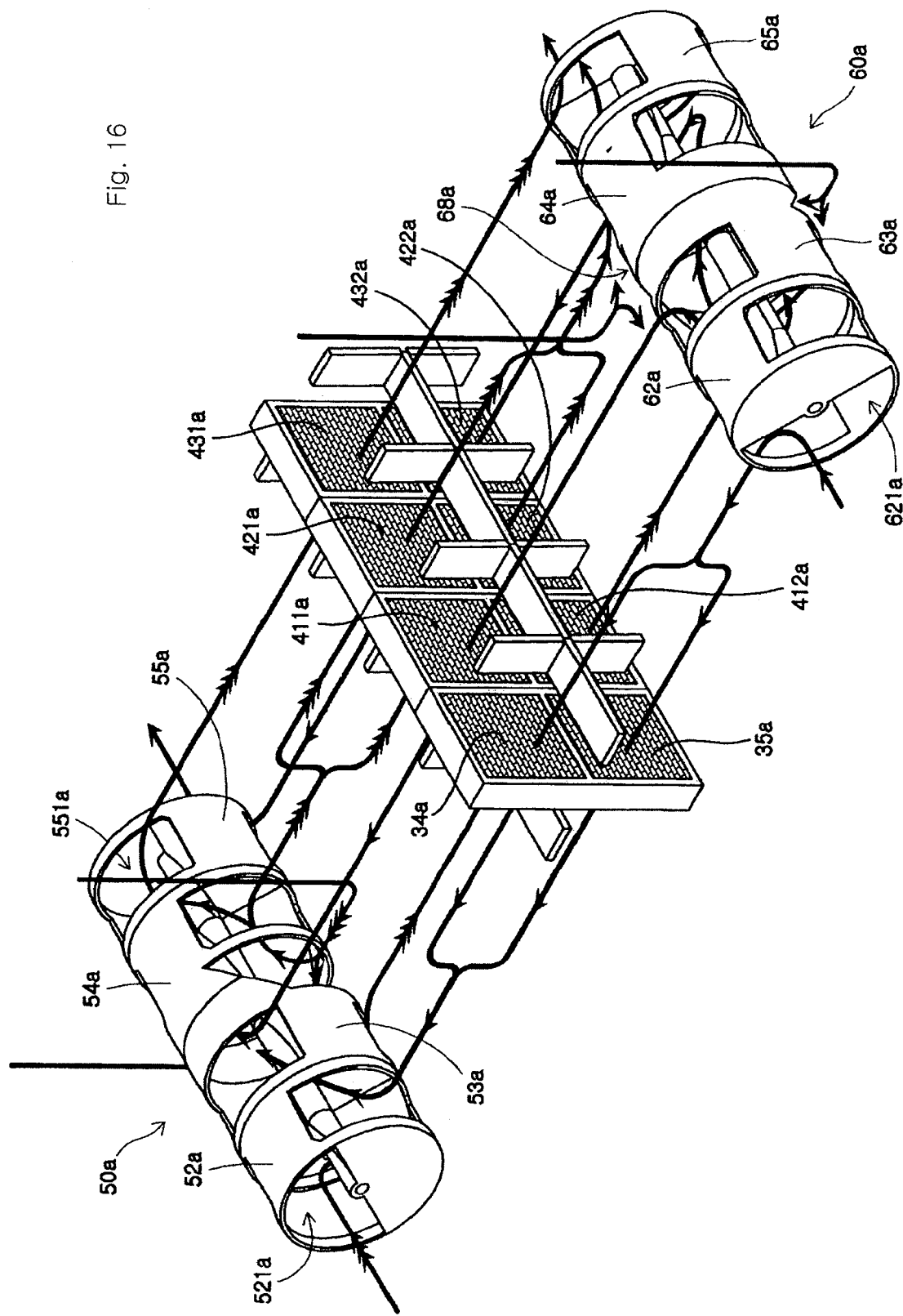
FIG. 16 is a perspective view showing main parts of the heat exchange apparatus of FIG. 12, illustrating an operational state thereof.

Referring to FIGS. 13 and 14, the first air distribution unit 70a includes a first valve member 50a, a guide member 72a, first and second cylindrical seals 74a and 75a, six ring-shaped seals 76a, and first and second covers 77a and 78a. Referring to FIG. 14, the first valve member 50a takes the shape of a cylinder extending along a first rotational axis 100a and includes first, second, third and fourth unit valves 52a, 53a, 54a and 55a formed and connected in series along the first rotational axis 100a. The first unit valve 52a is shown in FIG. 15 (a). Referring to FIG. 15 (a), the first unit valve 52a is configured in such a manner that the second wall 54 is removed from the first valve member 50 shown in FIG. 6. The second and third unit valves 53a and 54a are shown in FIG. 15 (b). Referring to FIG. 15 (b), the second and third unit valves 53a and 54a are configured in such a manner that both the end walls 52 and 54 are removed from the first valve member 50 shown in FIG. 6. The fourth unit valve 55a is shown in FIG. 15 (c). The fourth unit valve 55a is configured in such a manner that the first end wall 52 is removed from the first valve member 50 shown in FIG. 6. Four unit valves 52a, 53a, 54a and 55a are connected with one another to allow the respective separation blades 51a to extend continuously, thereby forming the first valve member 50a. Referring to FIG. 14, the interior of the first valve member 50a is divided into a first space 56a communicating with a first axial inlet opening 521a of the first unit valve 52a and a second space 57a communicating with a first axial outlet opening 551a of the fourth unit valve 55a by the separation blades 51a. The first valve member 50a is formed with an intermediate opening 58a communicating with the first space 56a at a position on a side wall where the second and third unit valves 53a and 54a are connected with each other. As shown in FIG. 16, the first and second valve members 50a and 60a serve to allow air introduced through the first and second axial inlet openings 521a and 621a to flow in a radial direction and thus to be distributed to the heat exchanging members 33a, 41a, 42a and 43a (see FIG. 13) and then to be exhausted through the first and second axial outlet openings 551a and 651a, respectively.

Referring to FIGS. 13 and 14, the guide member 72a includes eight guide passages 721a, 722a, 723a, 724a, 725a, 726a, 727a and 728a communicating, respectively, with heat exchanging media 34a, 35a, 411a, 412a, 421a, 422a, 431a and 432a of the heat exchanging unit 40a. The first upper and lower guide passages 721a and 722a communicating respectively with the two heat exchanging media 34a and 35a of the first heat exchanging member 33a communicate with an outer circumferential surface of the first unit valve 52a of the first valve member 50a. Thus, as the first valve member 50a rotates, first and second radial openings 522a and 523a formed in the first unit valve 52a of the first valve member 50a may communicate with the first upper or lower guide passage 721a or 722a of the guide member 72a. The second upper and lower guide passages 723a and 724a communicating respectively with the two heat exchanging media 411a and 412a of the second heat exchanging member 41a communicate with an outer circumferential surface of the second unit valve 53a of the first valve member 50a. Thus, as the first valve member 50a rotates, the first and second radial openings 531a and 532a formed in the second unit valve 53a of the first valve member 50a may communicate with the second upper or lower guide passage 723a or 724a of the guide member 72a. The third upper and lower guide passages 725a and 726a communicating respectively with the two heat exchanging media 421a and 422a of the third heat exchanging member 42a communicate with an outer circumferential surface of the third unit valve 54a of the first valve member 50a. Thus, as the first valve member 50a rotates, the first and second radial openings 541a and 542a formed in the third unit valve 54a of the first valve member 50a may communicate with the third upper or lower guide passage 725a or 726a of the guide member 72a. The fourth upper and lower guide passages 727a and 728a communicating respectively with the two heat exchanging media 431a and 432a of the fourth heat exchanging member 43a communicate with an outer circumferential surface of the fourth unit valve 55a of the first valve member 50a. Thus, as the first valve member 50a rotates, the first and second radial openings 552a and 553a formed in the fourth unit valve 55a of the first valve member 50a may communicate with the fourth upper or lower guide passage 727a or 728a of the guide member 72a.

Referring to FIG. 14, the first cylindrical seal 74a surrounds the external surfaces of the first and second unit valves 52a and 53a of the first valve member 50a, and the second cylindrical seal 75a surrounds the external surfaces of the third and fourth unit valves 54a and 55a of the first valve member 50a. The first cylindrical seal 74a is formed with a first opening 741a communicating with the first upper and lower guide passages 721a and 722a of the guide member 72a, and a second opening 742a communicating with the second upper and lower guide passages 723a and 724a of the guide members 72a. The second cylindrical seal 75a is formed with a third opening 751a communicating with the third upper and lower guide passages 725a and 726a of the guide member 72a, and a second opening 752a communicating with the fourth upper and lower guide passages 727a and 728a of the guide members 72a. The intermediate opening 58a of the first valve member 50a is exposed through a gap defined between the first and second cylindrical seals 74a and 75a. Six ring-shaped seals 76a are installed to surround the external surfaces of the two cylindrical seals 74a and 75a. In order to minimize the gap between the fixed first and second cylindrical seals 74a and 75a and the rotating first valve member 50a as well as to reduce friction therebetween, a material with a low coefficient of friction is coated or adhered to the internal surfaces of the cylindrical seals 74a and 75a or the external surface of the first valve member 50a.

The first and second covers 77a and 78a are coupled to the guide member 72a to surround the ring-shaped seals 76a. The first and second covers 77a and 78a protect the first valve member 50a and prevent the leakage of a small amount of air generated in the gap defined between the two cylindrical seals 74a and 75a and the first valve member 50a.

Referring to FIGS. 12, 13 and 16, the second air distribution unit 80a includes the second valve member 60a which has the same configuration as the first valve member 50a except that a separation blade 61a formed in the valve member 60a is twisted in a direction opposite to that of the separation blade 51a of the first valve member 50a. In addition, the other constitutions of the second air distribution unit 80a are symmetrical to those of the first air distribution unit 70a with respect to the heat exchanging unit 40a.

Now, the operation of the second embodiment of the heat exchange apparatus according to an embodiment of the present invention will be described in detail with reference to FIG. 16. Referring to FIG. 16, the first and second valve members 50a and 60a are synchronously rotated in opposite directions. In a state shown in FIG. 16, the first upper and lower heat exchanging media 34a and 35a, the first unit valve 52a of the first valve member 50a, and the first unit valve 62a of the second valve member 60a are operated in the same way as shown in FIG. 8. In addition, the second upper and lower heat exchanging media 411a and 412a, the second unit valve 53a of the first valve member 50a, and the second unit valve 63a of the second valve member 60a are operated in the same way as shown in FIG. 7. Further, the third upper and lower heat exchanging media 421a and 422a, the third unit valve 54a of the first valve member 50a, and the third unit valve 64a of the second valve member 60a are operated in the same way as shown in FIG. 6. Furthermore, the fourth upper and lower heat exchanging media 431a and 432a, the fourth unit valve 55a of the first valve member 50a, and the fourth unit valve 65a of the second valve member 60a are operated in the same way as shown in FIG. 9. Moreover, if the two valve members 50a and 60a continue to synchronously rotate in opposite directions in such a state, a direction in which air flows in or out of each of the heat exchanging media is alternately changed, and thus, a uniform flow rate can be ensured regardless of the rotating positions of the two valve members 50a and 60a.

In order to improve efficiency of or increase a flow rate of the heat exchange apparatus 20a according to an embodiment of the present invention, the total surface area of the heat exchanging media should be increased. However, since the heat exchange apparatus 20a according to an embodiment of the present invention can be configured by suitably selecting the height and length of the heat exchanging media contrary to an exemplary rotary type heat exchange apparatus, the degree of freedom in view of design for its appearance can be increased. In addition, since the external cross section of the heat exchanging media is rectangular, the heat exchanging media can be made in a variety of shapes as compared with a conventional rotary type heat exchange apparatus with a circular cross section.

Figure 17:
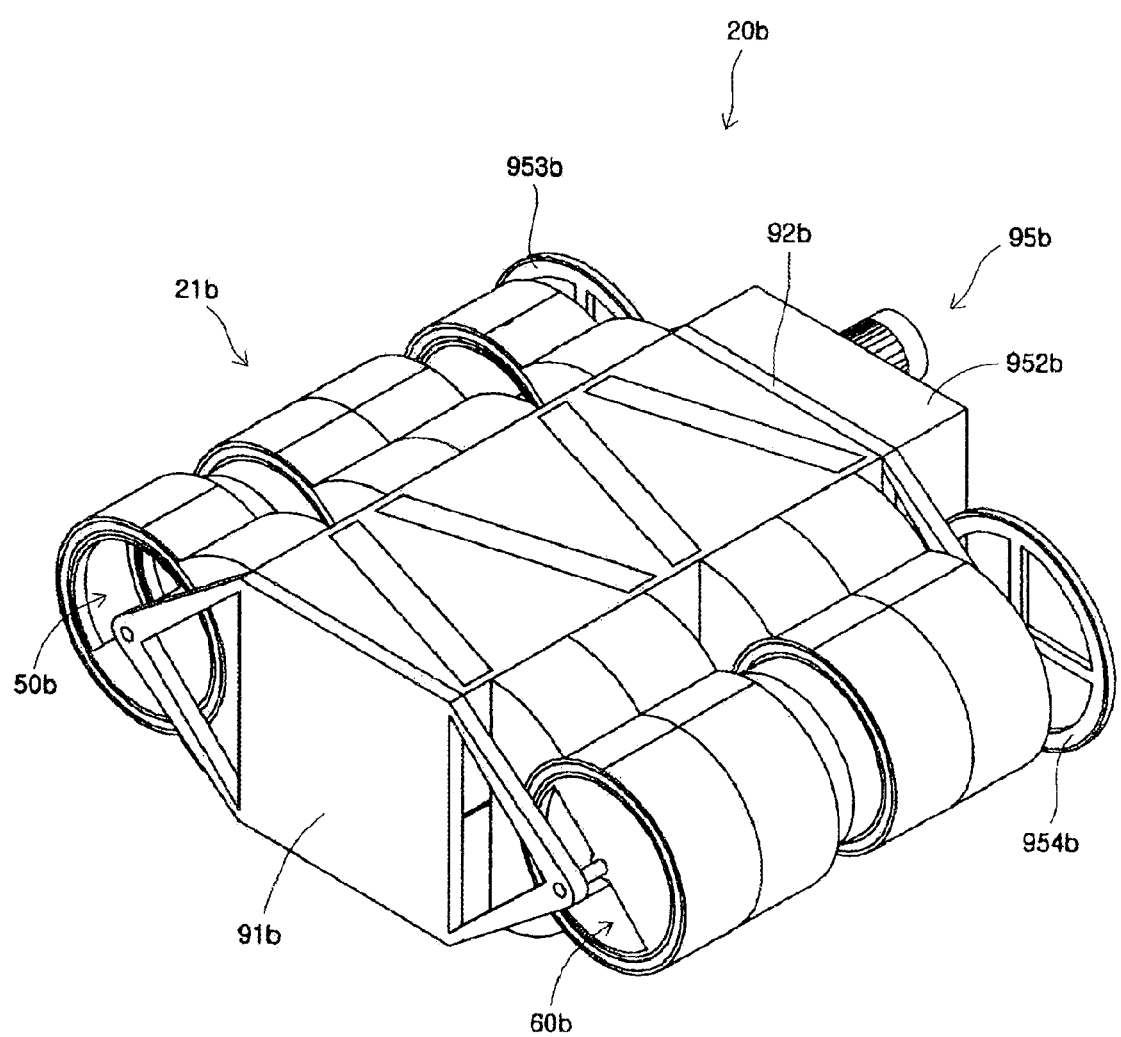
FIG. 17 is a perspective view showing a heat exchange apparatus according to an embodiment of the present invention.
Figure 18:
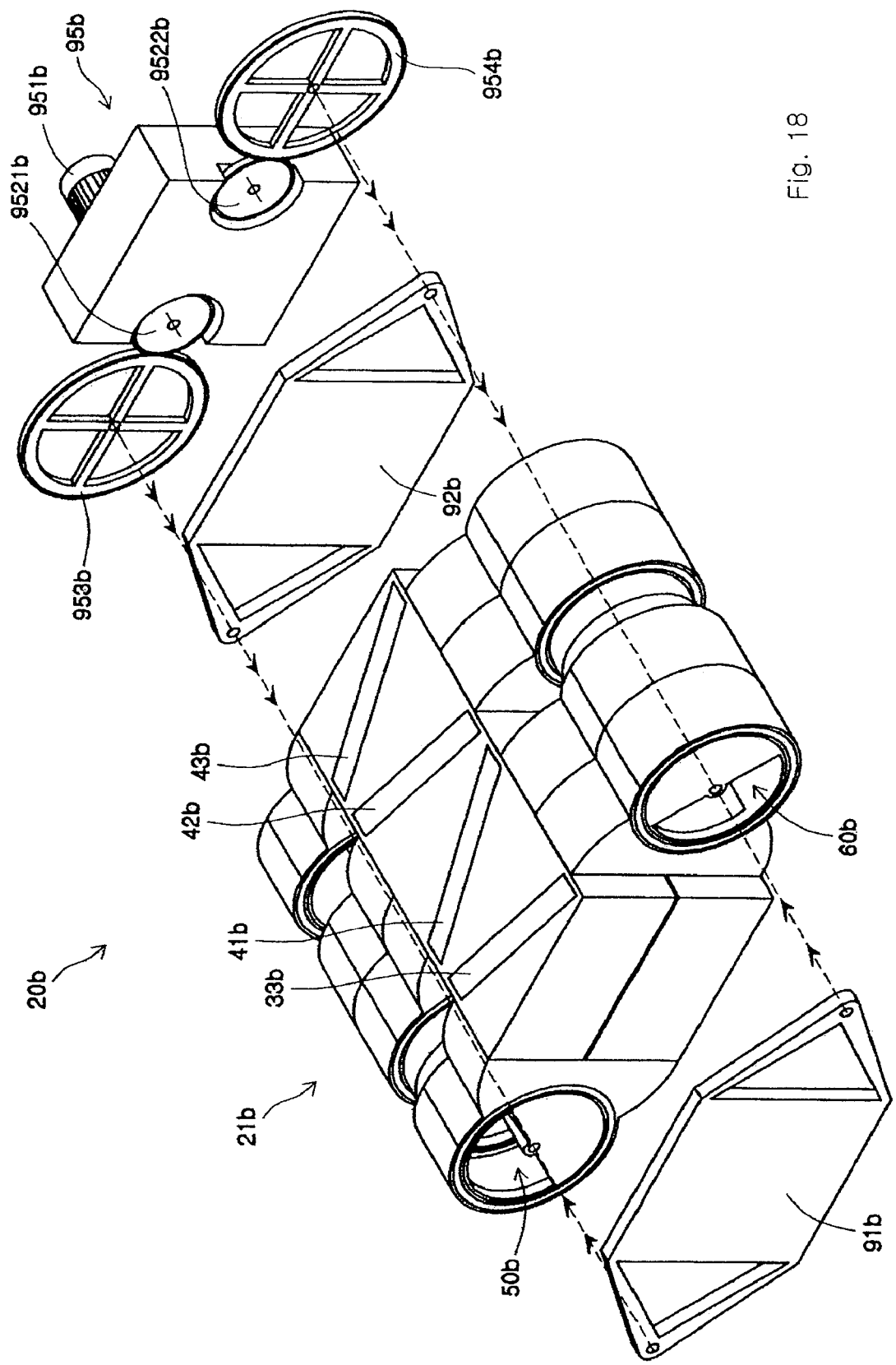
FIG. 18 is an exploded perspective view showing the heat exchange apparatus of FIG. 17.
Figure 19:
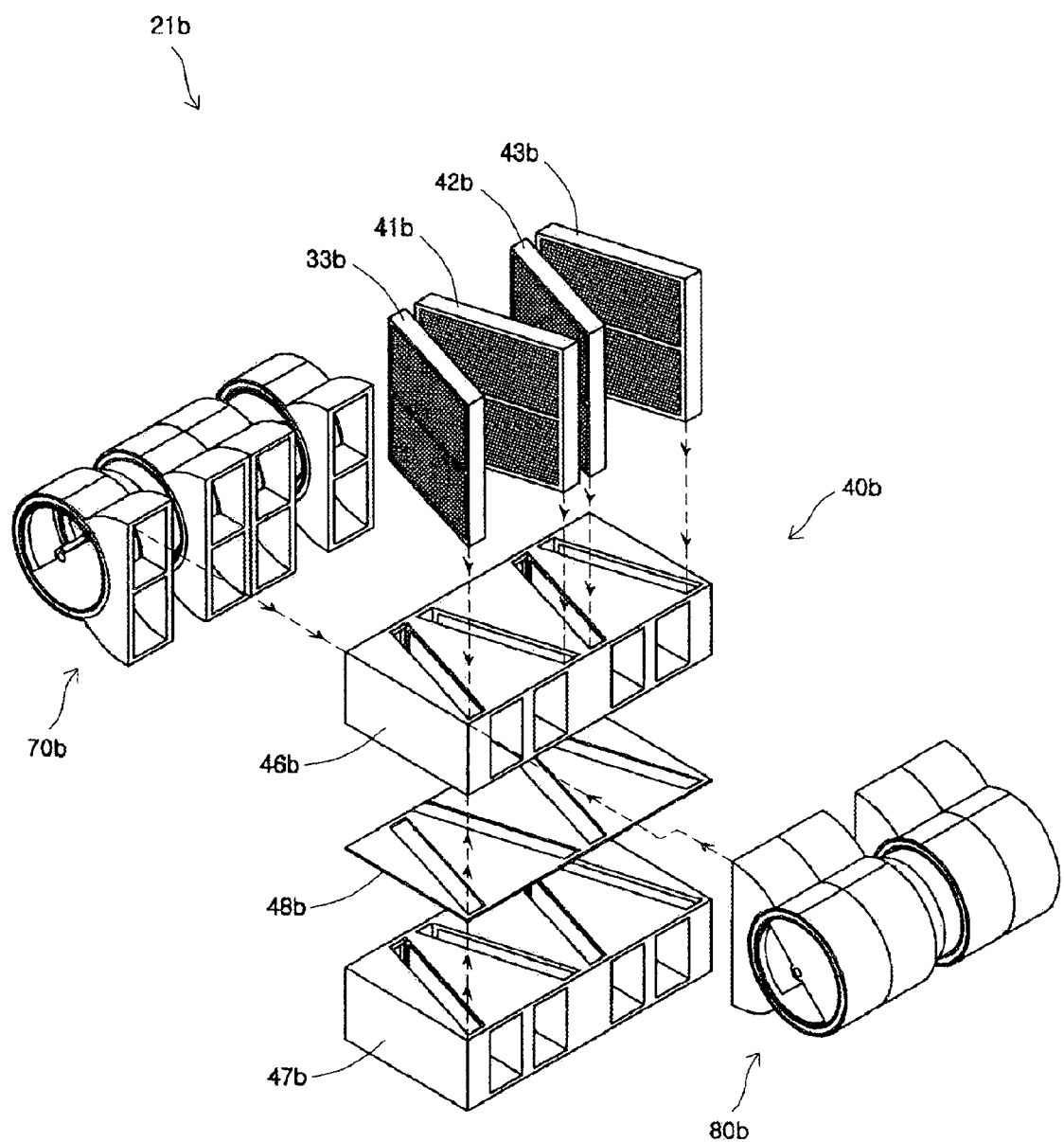
FIG. 19 is an exploded perspective view showing a heat exchanging module provided in the heat exchange apparatus of FIG. 18.

FIGS. 17 to 19 show a heat exchange apparatus according to an embodiment of the present invention, which has been proposed to further increase the total area of the heat exchanging media. Referring to FIGS. 17 and 18, the heat exchange apparatus 20b includes a heat exchange module 21b, first and second rotating shaft supporting members 91b and 92b, and a driving unit 95b. Referring to FIGS. 18 and 19, a plurality of heat exchanging members 33b, 41b, 42b and 43b, which take the shape of a rectangular plate and include heat exchanging media therein, are arranged in a zigzag pattern to increase the total effective surface area of the heat exchanging media. A heat exchanging unit 40b with a plurality of heat exchanging media installed therein includes a first housing 46b, a second housing 47b, and a plate-shaped seal 48b for sealing an interface between the two housings 46b and 47b. Since the other constitutions of the heat exchanging module 21b are substantially the same as those of the heat exchange apparatus 20a shown in FIGS. 12 and 13, detailed descriptions thereof will be omitted herein. In a case where the area of the heat exchanging media is increased to enhance the flow rate and efficiency of the heat exchange apparatus 20a shown in FIG. 12, the length of the heat exchange apparatus 20a may be excessively increased due to the height limit. In such a case, the heat exchange apparatus 20b shown in FIGS. 18 and 19 can be a very effective alternative.

Referring to FIGS. 17 and 18, the first and second rotating shaft supporting members 91b and 92b are installed at both ends of the first and second valve members 50b and 60b to bearing-support the rotating shafts of the first and second valve members 50b and 60b. The driving unit 95b is installed at a side of the second rotating shaft supporting member 92b and includes a driving motor 951b, a reduction gear 952b, and first and second gears 953b and 954b serving as a power transmission unit. The reduction gear 952b includes one input shaft (not shown) for the driving motor 951b and two output shafts 9521b and 9522b. The first and second gears 953b and 954b are engaged with the output shafts 9521b and 9522b of the reduction gear 952b, respectively. The first and second gears 953b and 954b are engaged with the rotating shafts of the first and second valve members 50b and 60b, respectively. The driving unit 95b causes the first and second valve members 50b and 60b to synchronously rotate in opposite directions. Since the other constitutions and operations of the heat exchange apparatus according to this embodiment are substantially same as those of the heat exchange apparatus shown in FIGS. 12 and 13, detailed descriptions thereof will be omitted herein.

Figure 20:
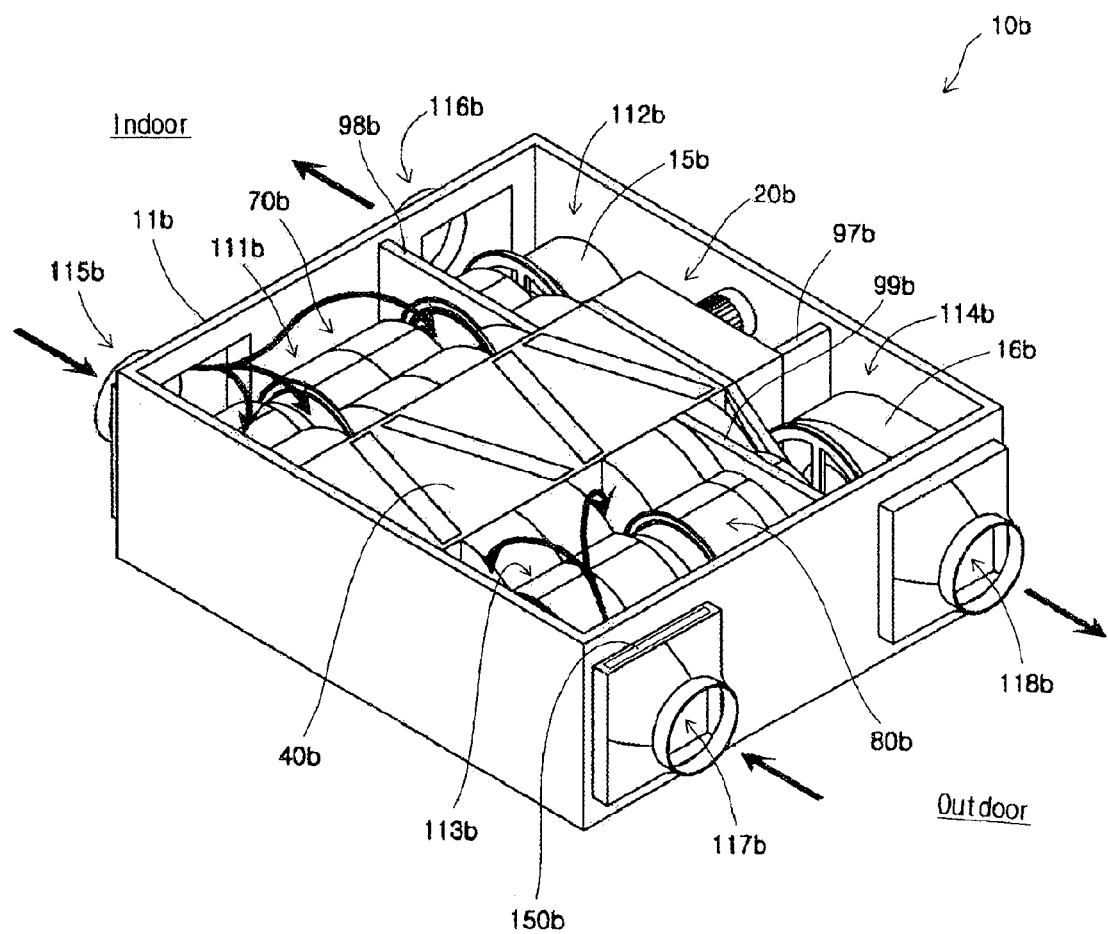
FIG. 20 is a perspective view of a heat exchanging ventilator equipped with the heat exchange apparatus of FIG. 17 according to an embodiment of the present invention, with a cover thereof opened to show an inner configuration.
Figure 21:
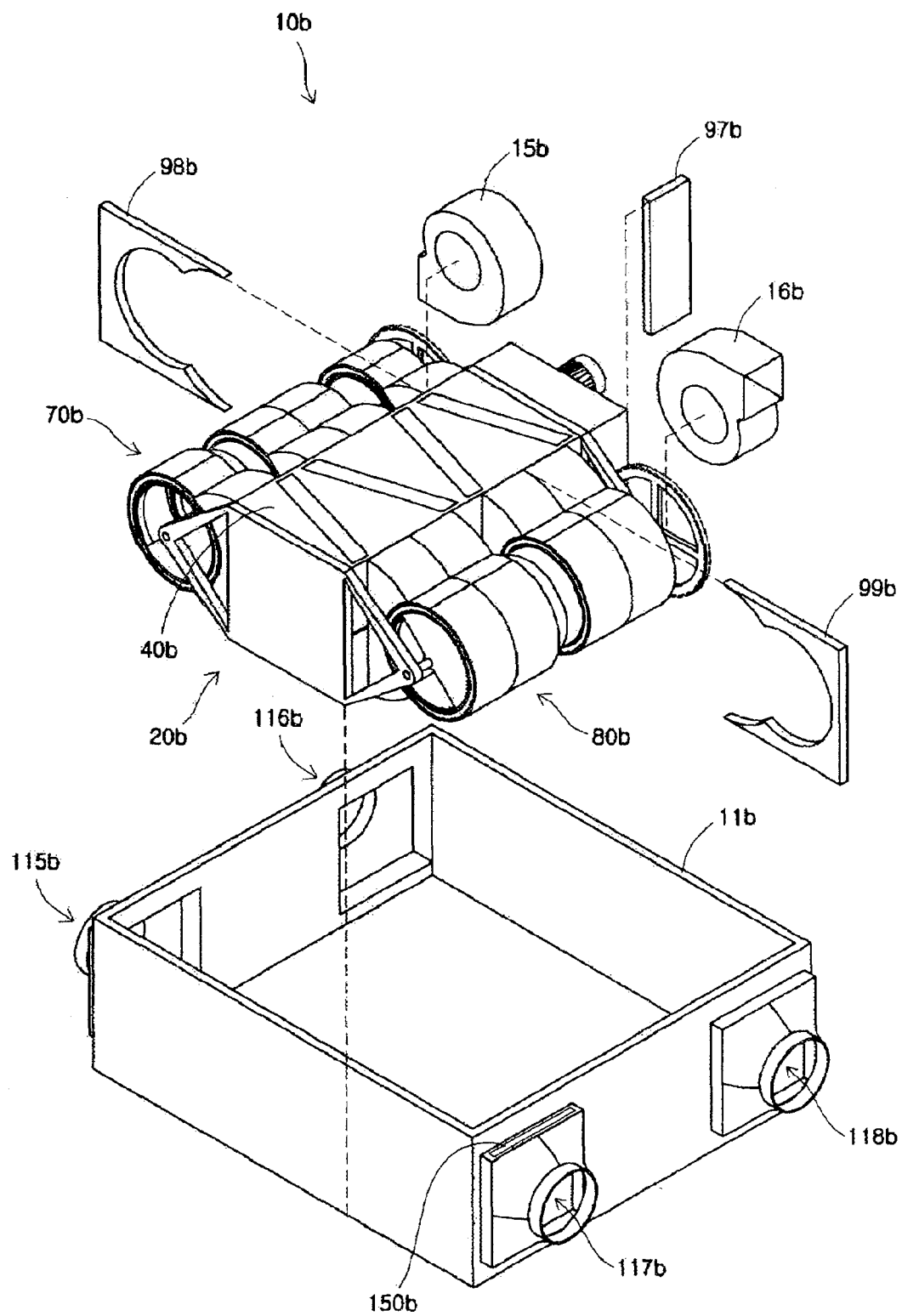
FIG. 21 is an exploded perspective view showing the heat exchanging ventilator of FIG. 20.

FIGS. 20 and 21 are perspective view and exploded perspective view showing a heat exchanging ventilator 10b using the heat exchange apparatus 20b shown in FIG. 17. Referring to FIGS. 20 and 21, the heat exchanging ventilator 10b comprises a case 11b; a heat exchange apparatus 20b; first, second and third partition walls 97b, 98b and 99b; and first and second blowers 15b and 16b. The case 11b takes the shape of a rectangle and is provided with first, second, third and fourth passages 115b, 116b, 117b and 118b formed in opposite side walls near four corners thereof. The case 11b can communicate with the outside through the four passages 115b, 116b, 117b and 118b. Among the four passages 115b, 116b, 117b and 118b, each of the two passages 115b and 117b for allowing air to be introduced into the case 11b is equipped with a filter 150b for filtering out foreign substances. The heat exchange apparatus 20b is accommodated in the case 11b in such a manner that the first air distribution unit 70b can be positioned toward the first and second passages 115b and 116b and the second air distribution unit 80b is positioned toward the third and fourth passages 117b and 118b. The interior of the case 11b is divided, by means of the heat exchanging unit 40b and the first partition wall 97b, into a space where the first air distribution unit 70b is positioned and a space where the second air distribution unit 80b is positioned. The space in the case 11b where the first air distribution unit 70b is positioned is divided, by means of the second partition wall 98b, into a first space 111b which communicates with the first passage 115b and allows air to be introduced into the first air distribution unit 70b and a second space 112b which communicates with the second passage 116b and allows air to be exhausted from the first air distribution unit 70b. In addition, the space in the case 11b where the second air distribution unit 80b is positioned is divided, by means of the third partition wall 99b, into a third space 113b which communicates with the third passage 117b and allows air to be introduced into the second air distribution unit 80b and a fourth space 114b which communicates with the fourth passage 114b and allows air to be exhausted from the second air distribution unit 80b. The first blower 15b is installed in the second space 112b, and the second blower 16b is installed in the fourth space 114b.

Now, the ventilating operation of the heat exchanging ventilator 10b will be described in detail with reference to FIG. 20. Hereinafter, it is assumed that a side where the first and second passages 115b and 116b of the case 11b are positioned is set as the inside of a room and a side where the third and fourth passages 117b and 118b of the case 11b are positioned is set as the outside of the room. Further, it is also assumed that indoor air has relatively higher temperature and absolute humidity than outdoor air. When the heat exchange apparatus 20b and the first and second blowers 15b and 16b are operated, the indoor air flows into the case 11b through the first passage 115b of the case 11b, passes through the heat exchange apparatus 20b, and then is exhausted to the outside of the room through the fourth passage 118b of the case 11b. At this time, thermal energy and moisture of the indoor air that is exhausted to the outside are transferred to the heat exchanging media (not shown) installed in the heat exchange apparatus 20b. Further, the outdoor air flows into the case 11b through the third passage 117b of the case 11b, passes through the heat exchange apparatus 20b, and is then introduced into the inside of the room through the second passage 116b of the case 11b. At this time, the outdoor air that is introduced into the room receives the thermal energy and moisture stored in the heat exchanging media (not shown) of the heat exchange apparatus 20b. In such a way, the room can be ventilated and thermal energy and moisture can also be transferred between the intake and exhaust air.

Although embodiments of the present invention have been explained, the present invention is not limited thereto. It can be understood by those skilled in the art that changes or modifications may be made thereto without departing from the scope and spirit of the present invention. Therefore, the scope of the present invention should be construed on the basis of the appended claims.

What is claimed is:

1. A heat exchange apparatus, comprising:
a heat exchanger comprising a first side and a second side, wherein the heat exchanger is configured to allow an air or gas to flow therethrough between the first side and the second side, wherein the heat exchanger is further configured to exchange heat with the air or gas flowing therethrough between the first side and the second side;
a first rotary valve configured to let the air or gas flow to or from the first side of the heat exchanger and configured to rotate about a first axis, wherein the first rotary valve is further configured to change flow directions of the air or gas as rotating about the first axis; and
a second rotary valve configured to let the air or gas flow to or from the second side of the heat exchanger and configured to rotate about a second axis, wherein the second rotary valve is further configured to change flow directions of the air or gas as rotating about the second axis,
wherein the second rotary valve is configured to rotate in synchronization with the first rotary valve so as to form a plurality of predetermined flow modes,
wherein the first rotary valve comprises a first rotary valve side, a second rotary valve side and a circumference interconnecting the first and second rotary valve sides thereof, the first rotary valve side comprising a first side opening, the second rotary valve side comprising a second side opening, the circumference comprising a first circumferential opening and a second circumferential opening, wherein the first circumferential opening is in fluid communication with the first side opening, wherein the second circumferential opening is in fluid communication with the second side opening.

2. The apparatus of claim 1, wherein the first rotary valve and the second rotary valve are configured to form a first one of the plurality of predetermined flow modes, wherein in the first flow mode, the first rotary valve is configured to receive a flow of the air or gas into the apparatus and direct the flow to the heat exchanger, and the second rotary valve is configured to receive the flow from the heat exchanger and direct the flow from the heat exchanger to outside the apparatus.

3. The apparatus of claim 2, wherein the first rotary valve and the second rotary valve are configured to form a second one of the plurality of predetermined flow modes, wherein in the second flow mode, the second rotary valve is configured to receive a flow of the air or gas into the apparatus and direct the flow to the heat exchanger, and the first rotary valve is configured to receive the flow from the heat exchanger and direct the flow from the heat exchanger to outside the apparatus.

4. The apparatus of claim 3, wherein the heat exchanger comprises a first portion and a second portion, wherein the first rotary valve and the second rotary valve are configured to form a third one of the plurality of predetermined flow modes, wherein in the third flow mode, the first rotary valve is configured to receive a first flow of the air or gas into the apparatus and direct the first flow to the first portion of the heat exchanger, and the second rotary valve is configured to receive the first flow from the first portion of the heat exchanger and direct the first flow from the heat exchanger to outside the apparatus, wherein still in the third flow mode, the second rotary valve is further configured to receive a second flow of the air or gas into the apparatus and direct the second flow to the second portion of the heat exchanger, and the first rotary valve is further configured to receive the second flow from the second portion of the heat exchanger and direct the second flow from the heat exchanger to outside the apparatus.

5. The apparatus of claim 4, wherein the first rotary valve and the second rotary valve are configured to form a fourth one of the plurality of predetermined flow modes, wherein in the fourth flow mode, the first rotary valve is configured to receive a first flow of the air or gas into the apparatus and direct the first flow to the second portion of the heat exchanger, and the second rotary valve is configured to receive the first flow from the second portion of the heat exchanger and direct the first flow from the heat exchanger to outside the apparatus, wherein still in the fourth flow mode, the second rotary valve is further configured to receive a second flow of the air or gas into the apparatus and direct the second flow to the first portion of the heat exchanger, and the first rotary valve is further configured to receive the second flow from the first portion of the heat exchanger and direct the second flow from the heat exchanger to outside the apparatus.

6. The apparatus of claim 1, wherein the heat exchanger comprises a first portion and a second portion, wherein the first rotary valve and the second rotary valve are configured to form a third one of the plurality of predetermined flow modes, wherein in the third flow mode, the first rotary valve is configured to receive a first flow of the air or gas into the apparatus and direct the first flow to the first portion of the heat exchanger, and the second rotary valve is configured to receive the first flow from the first portion of the heat exchanger and direct the first flow from the heat exchanger to outside the apparatus, wherein still in the third flow mode, the second rotary valve is further configured to receive a second flow of the air or gas into the apparatus and direct the second flow to the second portion of the heat exchanger, and the first rotary valve is further configured to receive the second flow from the second portion of the heat exchanger and direct the second flow from the heat exchanger to outside the apparatus.

7. The apparatus of claim 6, wherein the apparatus is configured such that the first flow and the second flow do not mix with each other.

8. The apparatus of claim 1, wherein the first rotary valve is configured to simultaneously receive and direct a first flow and a second flow of the air or gas, wherein the first rotary valve is configured to receive the first flow in a direction substantially parallel to the first axis and direct the first flow in a direction substantially perpendicular to the first axis toward the heat exchanger, wherein the first rotary valve is further configured to receive the second flow from the heat exchanger in a direction substantially perpendicular to the first axis and direct the second flow in a direction substantially parallel to the first axis.

9. The apparatus of claim 8, wherein the first rotary valve is configured such that the first flow and the second flow do not mix with each other.

10. The apparatus of claim 1, wherein the first axis and the second axis are substantially parallel to each other.

11. The apparatus of claim 1, wherein the first rotary valve is configured to rotate in a first rotational direction and at a first rotational speed, wherein the second rotary valve is configured to rotate in a second rotational direction opposite the first rotational direction and at a second rotational speed substantially the same as the first rotational speed.

12. The apparatus of claim 1, wherein further comprising:
an additional heat exchanger comprising a first side and a second side, wherein the additional heat exchanger is configured to allow an air or gas to flow therethrough between the first side and the second side, wherein the additional heat exchanger is further configured to exchange heat with the air or gas flowing therethrough between the first side and the second side;
an additional first rotary valve located facing the first side of the additional heat exchanger and configured to rotate about the first axis, wherein the additional first rotary valve is further configured to change flow directions of the air or gas as rotating about the first axis; and
an additional second rotary valve located facing the second side of the additional heat exchanger and configured to rotate about the second axis, wherein the additional second rotary valve is further configured to change flow directions as rotating about the second axis, wherein the additional second rotary valve is configured to rotate in synchronization with the additional first rotary valve so as to form the plurality of predetermined flow modes,
wherein the heat exchanger, the first rotary valve and the second rotary valve form a first combination, wherein the additional heat exchanger, the additional first rotary valve and the additional second rotary valve form a second combination, wherein the second combination are operable in synchronization with the first combination such that when the first combination is in one of the plurality of predetermined flow modes, the second combination is in the other flow mode of the plurality of predetermined flow modes.

13. The apparatus of claim 12, wherein the first combination is in a first one of the plurality of predetermined flow modes, wherein in the first flow mode, the first rotary valve is configured to receive a first flow into the apparatus and direct the first flow of the air or gas to the heat exchanger, and the second rotary valve is configured to receive the first flow from the heat exchanger and direct the first flow from the heat exchanger to outside the apparatus, wherein the second combination is in a second one of the plurality of predetermined flow modes, wherein in the second flow mode, the additional second rotary valve is configured to receive a second flow of the air or gas into the apparatus and direct the second flow to the additional heat exchanger, and the additional first rotary valve is configured to receive the second flow from the additional heat exchanger and direct the second flow from the additional heat exchanger to outside the apparatus.

14. The apparatus of claim 12, wherein the first rotary valve is configured to rotate in a first rotational direction and at a first rotational speed, wherein the additional first rotary valve is configured to rotate in a second rotational direction substantially the same as the first rotational direction and at a second rotational speed substantially the same as the first rotational speed.

15. The apparatus of claim 12, wherein the first rotary valve and the additional first rotary valve are interconnected to form an integrated rotary valve assembly which is configured to rotate about the first axis.

16. The apparatus of claim 1, further comprising a first blower and a second blower, wherein the first blower is configured to generate a first flow of the air or gas, which enters the first rotary valve and flows toward the second rotary valve, wherein the second blower is configured to generate a second flow of the air or gas, which enters the second rotary valve and flows toward the first rotary valve.

17. A building ventilation system, comprising:
the apparatus of claim 16, and
wherein the first blower is configured to generate the first flow from an inside of a building to the first rotary valve, wherein the second blower is configured to generate the second flow from an outside of the building to the second rotary valve.

18. The system of claims 17, wherein the first flow and the second flow are substantially free of mixing with each other.

19. A method of operating an heat exchange apparatus, the method comprising:
providing the apparatus of claim 1; and
rotating the first and second rotary valves in synchronization with each other so as to form a plurality of predetermined flow modes.

20. The method of claim 19, wherein providing comprises installing the apparatus in a building defining an inside and an outside such that the first rotary valve is configured to receive a flow of air or gas from the inside and that the second rotary valve is configured to receive a flow of air or gas from the outside.

21. The method of claim 19, wherein in a first one of the plurality of predetermined flow modes, the first rotary valve is configured to receive a flow of the air or gas into the apparatus and direct the flow to the heat exchanger, and the second rotary valve is configured to receive the flow from the heat exchanger and direct the flow from the heat exchanger to outside the apparatus.

22. The method of claim 21, wherein in a second one of the plurality of predetermined flow modes, the second rotary valve is configured to receive a flow of the air or gas into the apparatus and direct the flow to the heat exchanger, and the first rotary valve is configured to receive the flow from the heat exchanger and direct the flow from the heat exchanger to outside the apparatus.

23. The method of claim 19, wherein the heat exchanger comprises a first portion and a second portion, wherein in a third one of the plurality of predetermined flow modes, the first rotary valve is configured to receive a first flow into the apparatus and direct the first flow to the first portion of the heat exchanger, and the second rotary valve is configured to receive the first flow from the first portion of the heat exchanger and direct the first flow from the heat exchanger to outside the apparatus, wherein still in the third flow mode, the second rotary valve is configured to receive a second flow into the apparatus and direct the second flow to the second portion of the heat exchanger, and the first rotary valve is configured to receive the second flow from the second portion of the heat exchanger and direct the second flow from the heat exchanger to outside the apparatus.

24. The apparatus of claim 1, wherein the first rotary valve further comprise a partitioning wall partitioning between a first space and a second space in the first rotary valve, wherein the first space is in fluid communication with the first side opening and the first circumferential opening, and wherein the second space is in fluid communication with the second side opening and the second circumferential opening.

25. The apparatus of claim 1, wherein the second rotary valve comprises a first rotary valve side, a second rotary valve side and a circumference interconnecting the first and second rotary valve sides thereof, the first rotary valve side comprising a first side opening, the second rotary valve side comprising a second side opening, the circumference comprising a first circumferential opening and a second circumferential opening, wherein the first circumferential opening is in fluid communication with the first side opening, wherein the second circumferential opening is in fluid communication with the second side opening.

26. The apparatus of claim 25, wherein the second rotary valve further comprise a partitioning wall partitioning between a first space and a second space in the first rotary valve, wherein the first space is in fluid communication with the first side opening and the first circumferential opening, and wherein the second space is in fluid communication with the second side opening and the second circumferential opening.

27. The apparatus of claim 1, wherein the apparatus is configured such that the air or gas flows into or out of the first rotary valve generally in a first direction at the first side opening and that the air or gas flows though the heat exchange generally in a second direction that is generally perpendicular to the first direction.

28. The apparatus of claim 1, wherein the apparatus is configured such that the air or gas flows into or out of the first rotary valve generally in a first direction at the first side opening and that the air or gas flows into or out of the first rotary valve generally in a second direction at the first circumference opening, wherein the second direction is generally perpendicular to the first direction.

29. The apparatus of claim 1, wherein the first rotary valve is located facing the first side of the heat exchanger, and wherein the second rotary valve is located facing the second side of the heat exchanger.

* * * * *